US009330435B2

(12) United States Patent
Goodman et al.

(10) Patent No.: US 9,330,435 B2
(45) Date of Patent: May 3, 2016

(54) BARE EARTH FINDING AND FEATURE EXTRACTION FOR 3D POINT CLOUDS

(71) Applicant: Raytheon Company, Waltham, MA (US)

(72) Inventors: Vernon R. Goodman, Rockwall, TX (US); Rebekah Montgomery, Dallas, TX (US)

(73) Assignee: Raytheon Company, Waltham, MA (US)

(*) Notice: Subject to any disclaimer, the term of this patent is extended or adjusted under 35 U.S.C. 154(b) by 71 days.

(21) Appl. No.: 14/219,686

(22) Filed: Mar. 19, 2014

(65) Prior Publication Data

US 2015/0269705 A1  Sep. 24, 2015

(51) Int. Cl.
G06K 9/00 (2006.01)
G06T 3/00 (2006.01)
G06T 5/40 (2006.01)

(52) U.S. Cl.
CPC ............ *G06T 3/0037* (2013.01); *G06K 9/0063* (2013.01); *G06T 5/40* (2013.01); *G06T 2207/10028* (2013.01); *G06T 2207/10032* (2013.01); *G06T 2207/30181* (2013.01)

(58) Field of Classification Search
None
See application file for complete search history.

(56) References Cited

U.S. PATENT DOCUMENTS

| 8,537,338 | B1 * | 9/2013 | Medasani et al. | 356/4.01 |
| 9,135,507 | B2 * | 9/2015 | Chen | G06K 9/00637 |
| 2006/0013442 | A1 * | 1/2006 | McDowall et al. | 382/109 |
| 2008/0040076 | A1 | 2/2008 | Rahmes et al. | |
| 2009/0185741 | A1 * | 7/2009 | Nahari et al. | 382/154 |
| 2009/0231327 | A1 * | 9/2009 | Minear et al. | 345/419 |
| 2011/0144962 | A1 | 6/2011 | Blask et al. | |
| 2013/0021342 | A1 * | 1/2013 | Goodman | 345/424 |
| 2013/0022241 | A1 * | 1/2013 | Goodman | 382/103 |
| 2015/0081252 | A1 * | 3/2015 | Loss | 703/1 |
| 2015/0088466 | A1 * | 3/2015 | Zhang et al. | 703/1 |
| 2015/0199839 | A1 * | 7/2015 | Chon | G06T 7/0028 345/427 |
| 2015/0221079 | A1 * | 8/2015 | Schultz | G06T 7/0004 382/190 |

FOREIGN PATENT DOCUMENTS

WO  WO-2015143134 A1  9/2015

OTHER PUBLICATIONS

Fernandez, J. C., et al. "An overview of lidar point cloud processing software." GEM Center Report No. Rep_2007-12-001, University of Florida (2007).*

Albota, Marius A., et al., "Three-dimensional imaging laser radar with a photon-counting avalanche photodiode array and microchip laser", *Applied Optics*, 41(36), (2002), 7671-7678.

(Continued)

*Primary Examiner* — Nirav G Patel
*Assistant Examiner* — Narek Zohrabyan
(74) *Attorney, Agent, or Firm* — Schwegman Lundberg & Woessner, P.A.

(57) ABSTRACT

Generally discussed herein are systems and apparatuses that relate to systems and methods for analysis of 3D light radar (LiDAR) point clouds. The disclosure also includes techniques of bare earth and feature extraction. According to an example, bare earth and feature extraction can include estimation of a ground layer, generation of an inverse Above Ground Layer (AGL), identification of paths, roads, and cleared areas, identification and removal of buildings, and identification of a Human Activity Layer (HAL). This combination of features may provide for a much higher probability of detection of human activity.

17 Claims, 22 Drawing Sheets

(56) References Cited

OTHER PUBLICATIONS

Cho, Peter, et al., "Real-Time 3D Ladar Imaging", *35th Applied Imagery and Pattern Recognition Workshop (AIPR '06)*, (2006), 7 pgs.

Pratt, William K., "10.3. Noise Cleaning", *Digital Image Processing*, Second Edition, Wiley Interscience, New York, (1991), 285-309

"Documentation—Point Cloud Library (PCL): Removing outliers using a Conditional or RadiusOutlier removal", XP055191305, section Radius Outlier Removal Background, [Online]. Retrieved from the Internet: <URL:https://web.archive.org/web/2013082617 4537/http://pointclouds.org/documentati on/tutorials/remove_outliers.php [retrieved on May 22, 2015]>, (Aug. 26, 2013).

"Documentation—Point Cloud Library (PCL): Removing outliers using a Statistical Out lier Removal filter", XP055191165, Retrieved from the Internet: section "Background", first paragraph, [Online]. Retrieved from the Internet: <URL:https://web.archive.org/web/2013082618 4940/http://pointclouds.org/documentation/tutorials/statistical_outlier.php [retrieved on May 22, 2015]>, (Aug. 26, 2013).

"International Application Serial No. PCT/US2015/021433, International Search Report mailed Jun. 2, 2015", 4 pgs.

"International Application Serial No. PCT/US2015/021433, Written Opinion mailed Jun. 2, 2015", 10 pgs.

Jixian, Zhang, et al., "SVM-Based Classification of Segmented Airborne LiDAR Point Clouds in Urban Areas", Remote Sensing, vol. 5, No. 8, 7 XP055191309, DOI: 10.3390/rs5083749 section 2.3, (May 7, 2012), 3749-3775.

* cited by examiner

US 9,330,435 B2

BARE EARTH FINDING AND FEATURE EXTRACTION FOR 3D POINT CLOUDS

TECHNICAL FIELD

Examples generally relate to analysis of multiple three-dimensional (3D) points collected using a light radar (LiDAR) ranging system.

TECHNICAL BACKGROUND

Multiple 3D points may be collected using a LiDAR ranging system, and may be stored as a point cloud. Analysis of 3D LiDAR point clouds collected from heavily forested areas may be time-intensive for an analyst. An analyst may manually identify and remove foliage to search for features below the foliage canopy. These features, such as trails or buildings, may be easy for an analyst to miss through manual foliage identification and removal.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

Examples in this disclosure relate to systems and methods for analysis of 3D LiDAR point clouds in heavily forested areas. The accuracy and efficiency of such analysis may be improved using a bare earth and feature extraction. Bare earth and feature extraction may include estimation of a ground layer, generation of an inverse Above Ground Layer (AGL), identification of paths, roads, and cleared areas, identification and removal of buildings, and identification of a Human Activity Layer (HAL). This combination of features may provide for a much higher probability of detection of human activity.

The inverse AGL may include intensity values based on height above ground, which may be used to detect one or more ground or Human Activity features. Conventional AGL images may represent higher altitude objects with lighter shades or colors, thereby drawing the attention of a viewer of the AGL image may be directed to the objects above ground. For identification of a ground layer, an inverse AGL image may represent ground levels with lighter shades or colors, thereby drawing the attention of a viewer to the ground level. The resulting inverse AGL file may be used to identify roads and paths under trees. For example, in an area with several trees, cleared areas will appear to be brighter using the inverse AGL. Similarly, the inverse AGL may be used to identify buildings near paths. For example, buildings may be identified by altering the intensity of the displayed inverse AGL, and a color or brightness may be selected based on an estimated height of the building. Additionally, the inverse AGL may display buildings by searching for groupings of points with similar altitudes, where the AGL may display flatter objects with greater intensity. Other evidence of human activity and buildings otherwise not seen may be identified by altering the display of the inverse AGL. For example, by turning off intensity and applying colors by altitude, the earth contours may be flattened, and structures may be displayed relative to the zero altitude. Additionally, setting a maximum height within the inverse AGL display may allow a viewer to see structures of similar heights.

Figure 1:
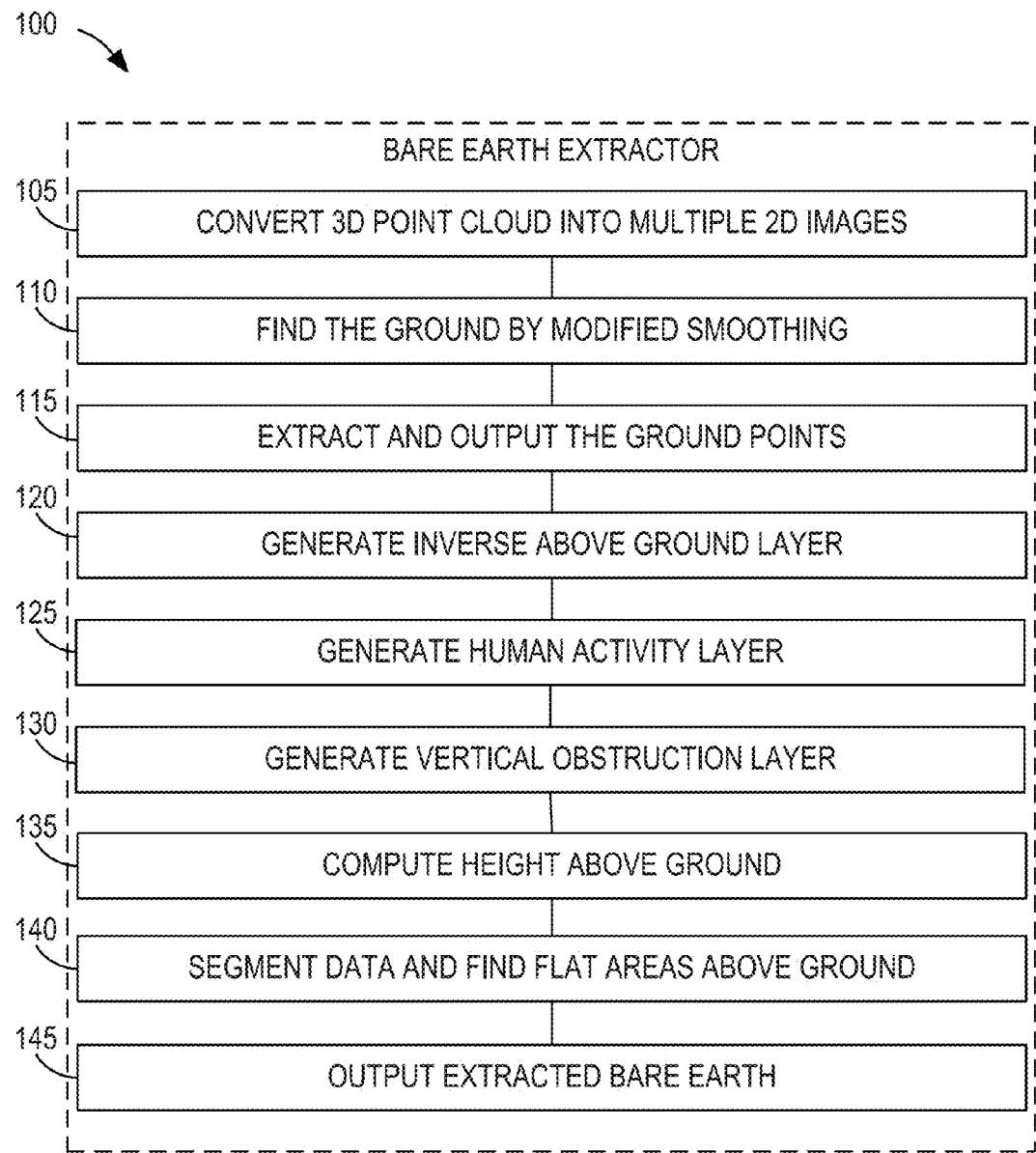
FIG. 1 shows a flow chart overview of the bare earth extractor, according to an embodiment.

FIG. 1 shows a flow chart overview of the bare earth extractor 100, according to an embodiment. The bare earth extractor 100 may include conversion of a point cloud including multiple LiDAR 3D points into multiple 2D images 105. Using 2D images, the bare earth extractor 100 may identify ground points using modified smoothing 110. Identification of ground points 110 may include finding potential ground points by histogramming, deleting isolated points, optionally removing buildings, performing large area height averaging, and performing small area height averaging. Once identified, ground points may be extracted and output 115. Using the output ground points, one or more paths may be identified and an inverse Above Ground Layer (AGL) may be generated 120. Additionally, a Human Activity Layer (HAL) may be extracted 125 and a Vertical Obstruction Layer (VOL) may be generated 130. Finally, a height above ground may be determined 135, and a data segmentation and flat area determination 145 may provide the extracted bare earth values. Each of the steps within the bare earth extractor 100 may include one or more series of steps, such as the conversion of a 3D point cloud into multiple 2D images 105 shown in FIG. 2.

Figure 2:
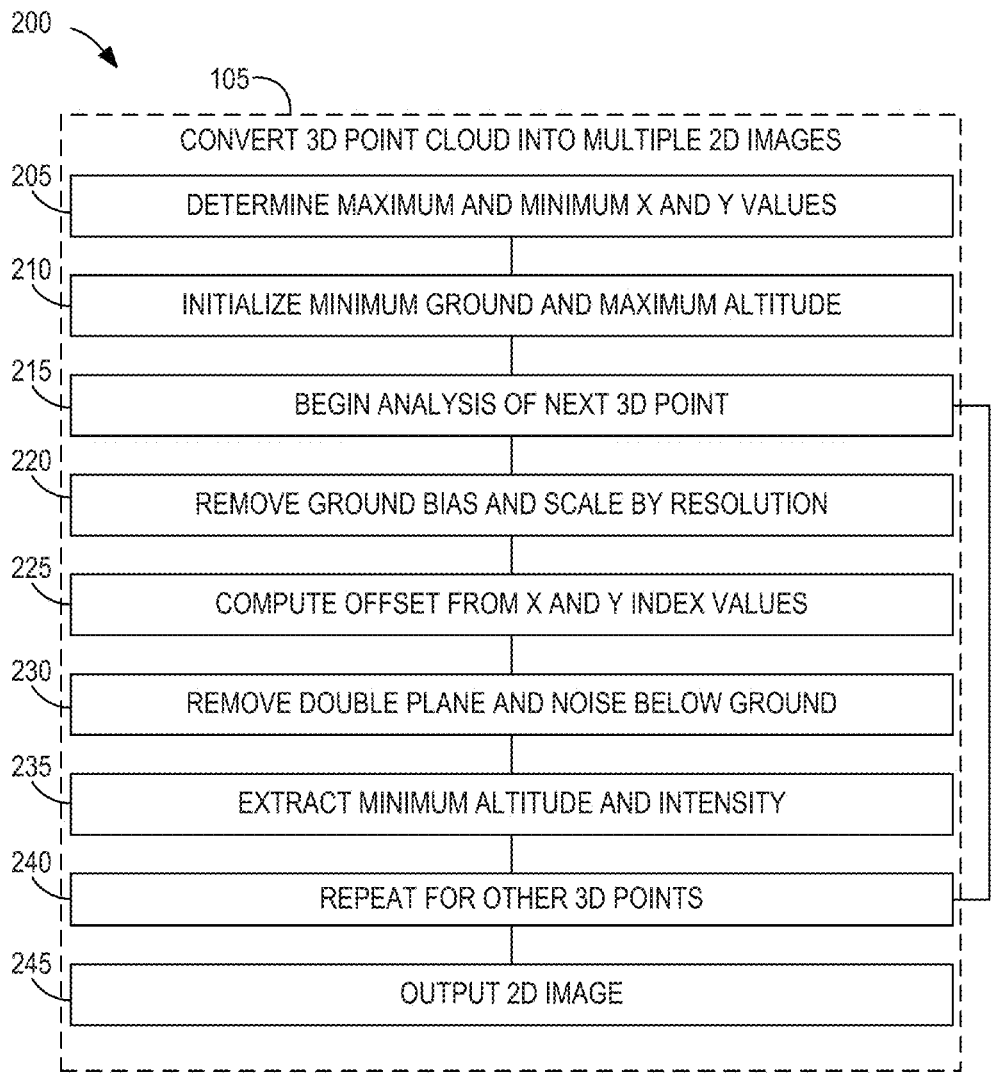
FIG. 2 shows a flow chart of the conversion of a 3D point cloud into multiple 2D images, according to an embodiment.

FIG. 2 shows a flow chart 200 of the conversion of a 3D point cloud into multiple 2D images 105, according to an embodiment. The first step for extraction of bare earth may be to convert the 3D point cloud into 2D images. In some examples, point clouds may be collected using Geiger-mode avalanche photodiode (GmAPD) LiDAR data generated from a short light amplification by stimulated emission of radiation (LASER) pulse. GmAPD LiDAR data often includes false returns below ground level, so conversion of GmAPD LiDAR data into 2D images includes removing these false returns. GmAPD LiDAR data may include values in Cartesian coordinates (e.g., X, Y, Z), and may be represented by voxels (e.g., 3D pixels, 3D points). 2D conversion 105 may include determining minimum and maximum X and Y values 205, which may be used to determine X and Y dimensions and the number of voxels. Because the GmAPD LiDAR data is often collected from above, the maximum expected altitude may be initialized to the lowest return Z value, and the ground (e.g., collecting point) may be initialized to the highest return Z value. For each voxel, the X and Y index values may be determined by removing the minimum bias and scaling by the system resolution 220. The X and Y index values may be used to compute a one-dimensional (1D) offset 225. By computing the Z axis corresponding to the offset, any double ground plane and noise below the ground plane may be removed 230. When multiple voxels share an offset, the voxels may be differentiated (e.g., compared) to identify and store the voxel with the greatest minimum altitude and greatest intensity 235. This process may be repeated for other 3D points 240, and the resultant 2D image may be output 245.

Figure 3:
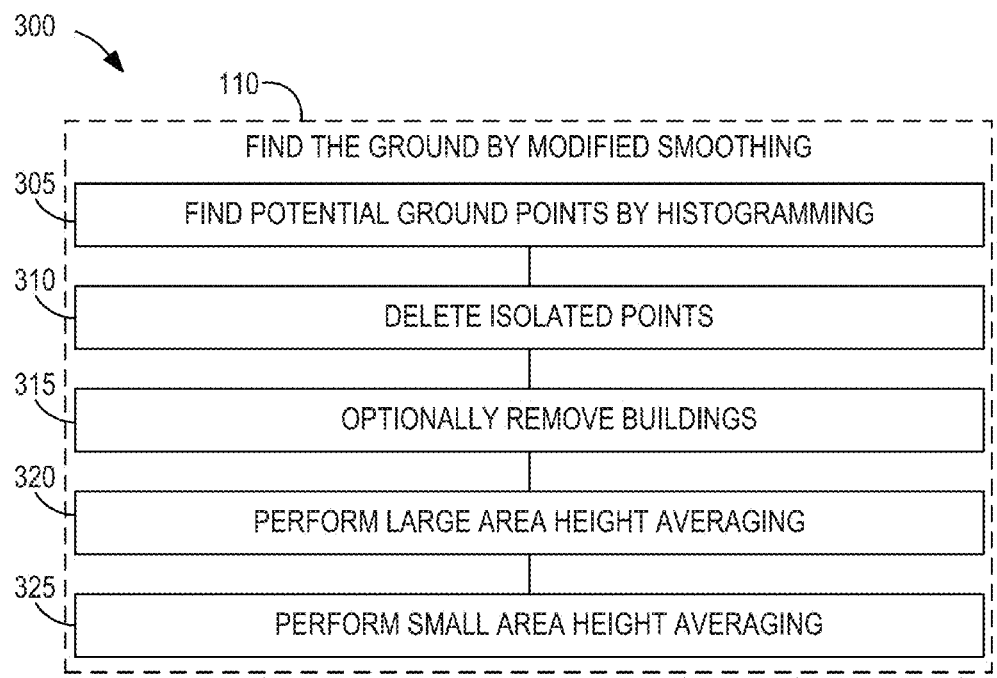
FIG. 3 shows a flow chart of finding ground points by modified smoothing, according to an embodiment.

FIG. 3 shows a flow chart 300 of finding ground points by modified smoothing 110, according to an embodiment. Finding ground points 110 may include finding potential points through histogramming 305 and deletion of isolated points 310. Finding ground points 110 may optionally include removing buildings using an eight-pass analysis 315. Finding ground points 110 may also include performing large area height averaging 320 and performing small area height averaging 325. Each of these five steps is described in FIG. 4 through FIG. 8, below.

Figure 4:
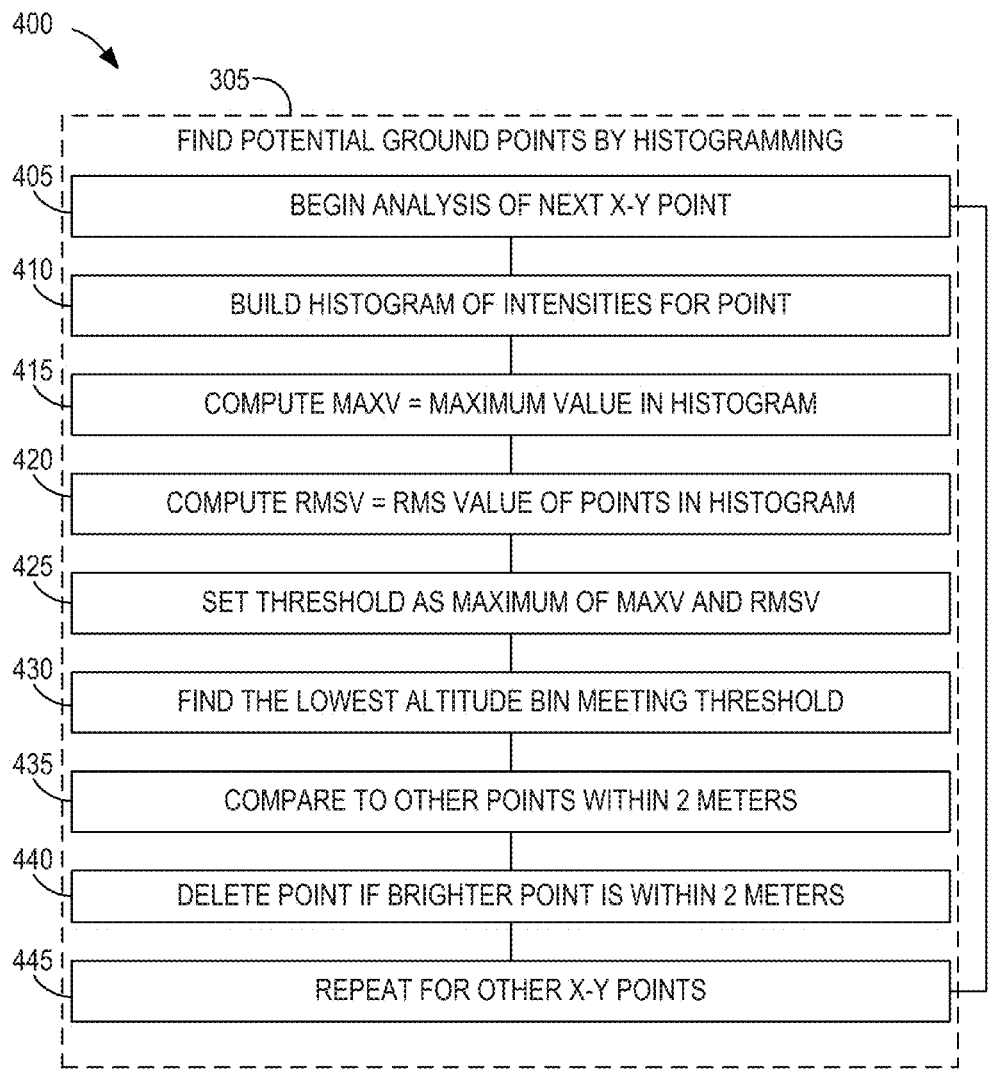
FIG. 4 shows a flow chart of finding potential ground points by histogramming, according to an embodiment.

FIG. 4 shows a flow chart of finding potential ground points by histogramming 400, according to an embodiment. Histogramming 400 may include identification of each X value and Y value 405, and building a histogram of intensities for each point 410. For each histogram, a maximum value in the histogram may be stored as MAXV 415, and a root mean square (RMS) value of points in the histogram may be stored as RMSV 420. A threshold may be set as the maximum of MAXV and RMSV 420. Altitude ranges may be collected into bins, where each bin may include Z values within one meter (e.g., altitude ranges between 100 meters and 101 meters). The threshold may be used to identify the lowest altitude bin that meets the threshold 430. The current point may be compared with nearby voxels within 2 meters above the current point 435. If a nearby voxel is identified and its intensity is greater than the current point, then the current point is deleted 440. This histogramming 400 process is repeated for other points 445.

Figure 5:
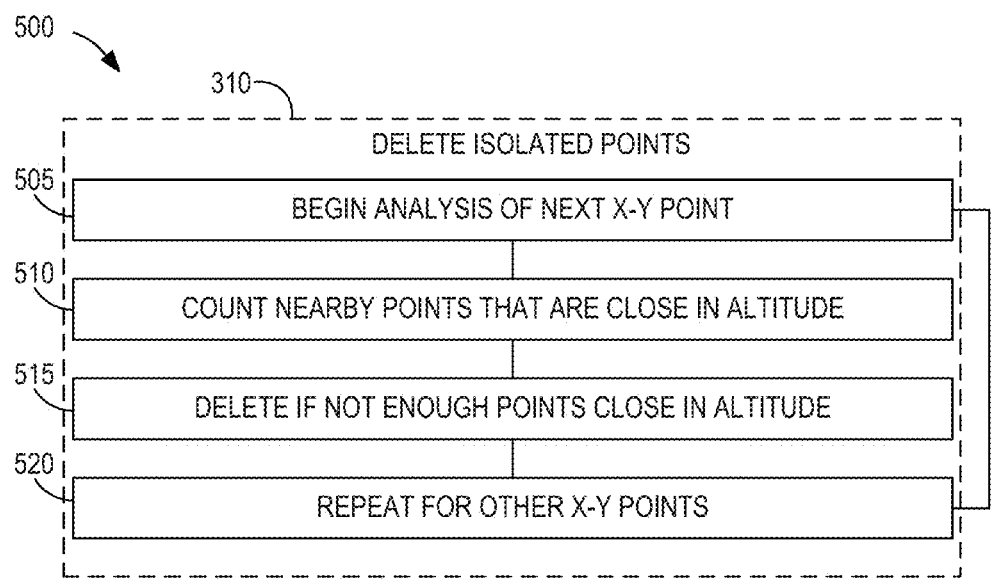
FIG. 5 shows a flow chart of deleting isolated points, according to an embodiment.

FIG. 5 shows a flow chart 500 of deleting isolated points 310, according to an embodiment. Deletion of isolated points may include identification of each X value and Y value 505, and counting the number of nearby points that are close in altitude 510. If the number of nearby points is below a predetermined threshold, the current point may be deleted 515. The deletion of isolated points 310 may be repeated for other points 520.

Figure 6:
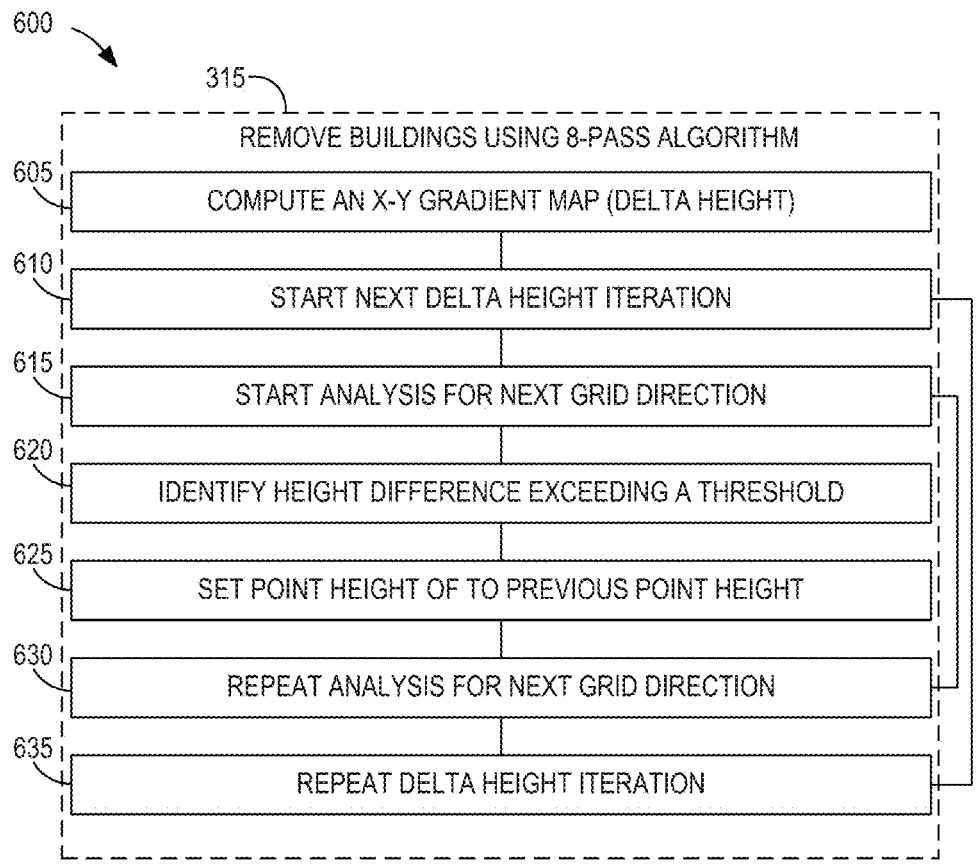
FIG. 6 shows a flow chart of removing buildings using 8-pass algorithm, according to an embodiment.

FIG. 6 shows a flow chart 600 of removing buildings using 8-pass algorithm 315, according to an embodiment. Building removal 315 is an optional step, and may not be used for point clouds that are expected not to contain buildings or similar structures. Building removal 315 begins by computing a gradient map (e.g., delta height) for each point 605. Building removal 315 may proceed through each delta height point in the gradient map 610, and may proceed twice through four directions on the grid 615. For example, the first direction may be from left to right: starting from the left, each point may be compared to the point immediately to the right. Each pair of points is compared to identify whether the difference between the heights of each point exceeds a delta height threshold 620. For each point whose height difference exceeds the delta height threshold, the height of that point is set to the height of the previous point 625. Once all of the points have been analyzed in a first direction, building removal 315 may be repeated proceed in the next direction 630. In some embodiments, there may be four grid directions, including left to right, bottom to top, right to left, and top to bottom. The group of directions may be repeated 635, resulting in an eight-pass analysis.

Figure 7:
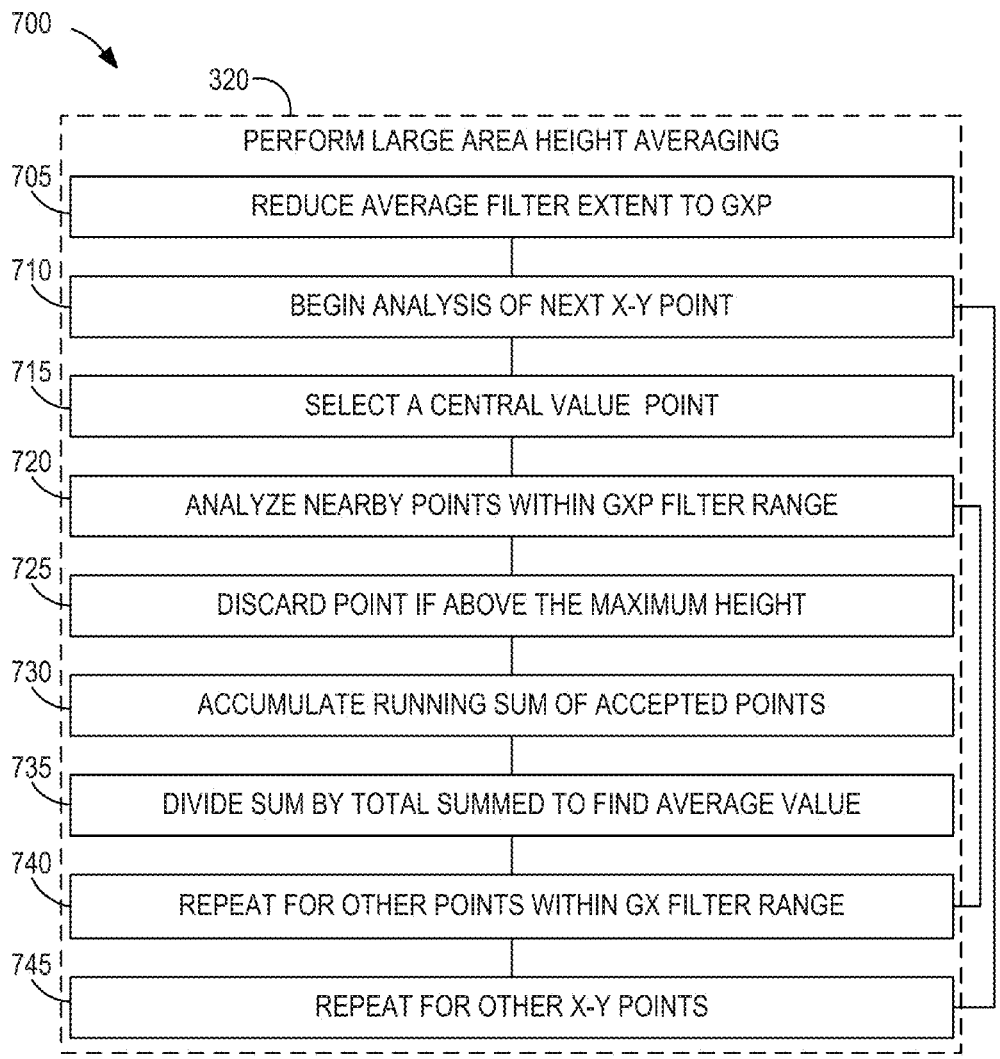
FIG. 7 shows a flow chart of performing large area height averaging, according to an embodiment.

FIG. 7 shows a flow chart 700 of performing large area height averaging 320, according to an embodiment. Large area height averaging 320 may begin by identifying a large area within the point cloud, and using smooth and horizontal resolution parameters, a corresponding averaging filter may be assigned to GXP 705. For each X and Y point 710, a central value point may be identified 715. Using this central value point, all of the X and Y points within the range of filter GXP may be analyzed 720, and points may be discarded if the Z difference is too large in either direction, if the point is radially too far away from central point, or if the point is above the maximum height 725. A running sum of points not discarded may be accumulated 730, and the running sum may be divided by the number of points to determine an average value 735. Large area height averaging 320 may be repeated for other nearby points within the GXP filter range 740 and for other X and Y points 745.

Figure 8:
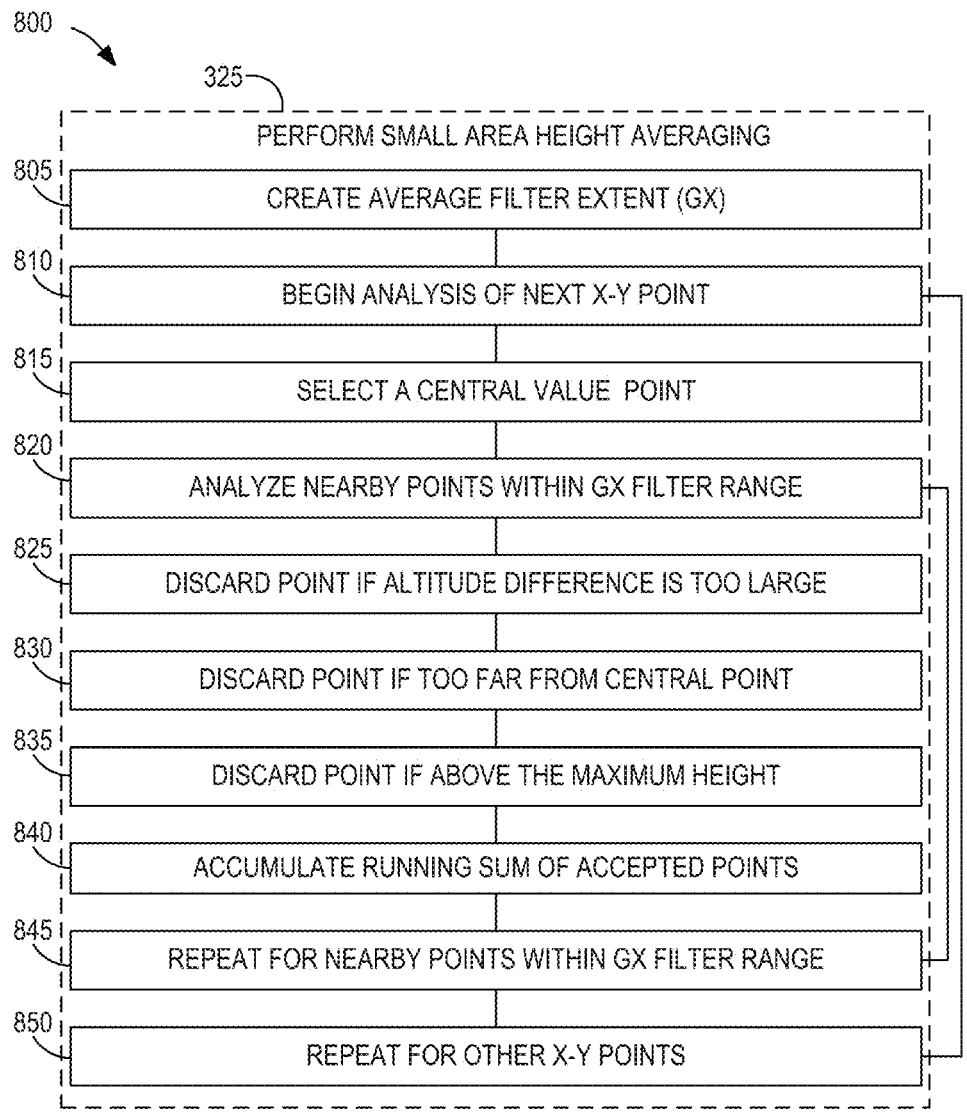
FIG. 8 shows a flow chart of performing small area height averaging, according to an embodiment.

FIG. 8 shows a flow chart 800 of performing small area height averaging 325, according to an embodiment. Small area height averaging 325 may use a reduced average filter GX, where GX may be half of the size of the large area filter GXP. For each X and Y point 810, a central value point may be identified 815. Using this central value point, all of the X and Y points within the range of filter GXP may be analyzed 820, and points may be discarded if the Z difference is too large in either direction 825, if the point is radially too far away from central point 830, or if the point is above the maximum height 835. A running sum of points not discarded may be accumulated 840, and the running sum may be divided by the number of points to determine an average value 845. Small area height averaging 325 may be repeated for other nearby points within the GXP filter range 845 and for other X and Y points 850.

Figure 9:
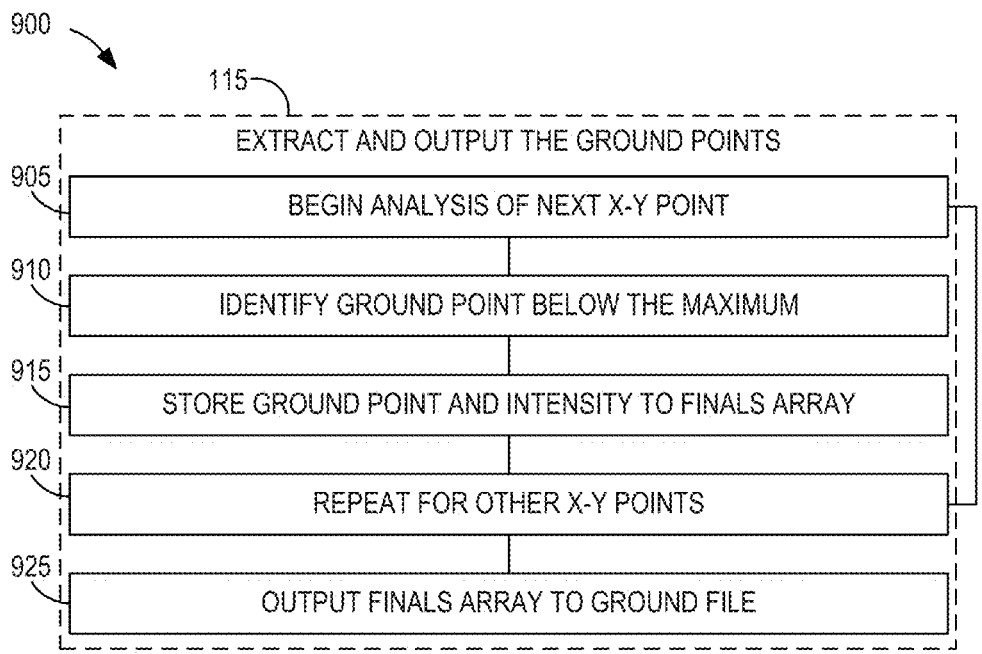
FIG. 9 shows a flow chart of extracting and outputting the ground points, according to an embodiment.

FIG. 9 shows a flow chart 900 of extracting and outputting the ground points 115, according to an embodiment. For each of the X and Y points 905, a maximum value may be determined, which may be used to identify ground points below the maximum 915. Each identified ground point and its associated intensity may be added to a finals array 915. The process may be repeated for all other X and Y points 920. The resulting finals array may be added to a ground file 925.

Figure 10:
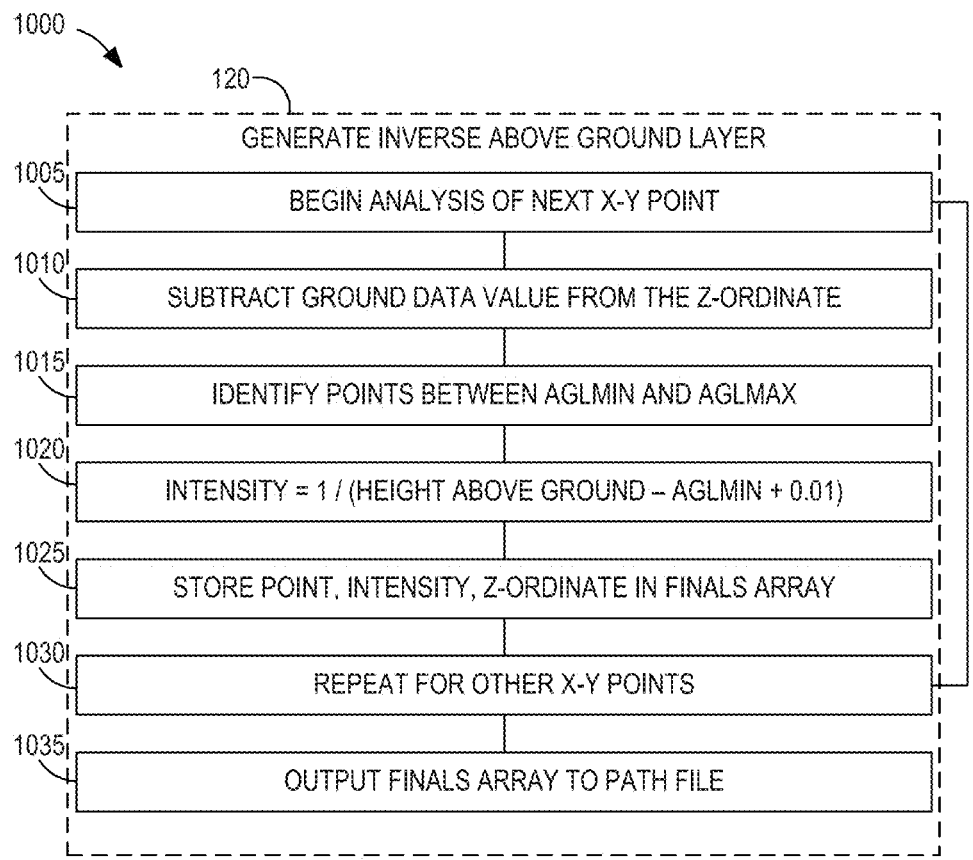
FIG. 10 shows a flow chart of identifying paths and generating the inverse above ground layer (AGL), according to an embodiment.

FIG. 10 shows a flow chart 1000 of identifying paths and generating the inverse above ground layer (AGL) 120, according to an embodiment. To generate the inverse AGL 120, each X and Y point may be analyzed 1005, and ground data may be subtracted from the Z ordinate of the point 1010. Points between a minimum AGL (AGLMIN) and a maximum AGL (AGLMAX) may be identified 1015. For each identified point, the AGL intensity may be computed as the inverse of the quantity of the height above ground less AGLMIN plus 0.01 1020, restated as 1/(height above ground−AGLMIN+ 0.01). This inverse AGL calculation may be performed for additional X and Y points 1030, and the resultant points and associated intensities may be stored in an array and output to a path file 1035.

Figure 11:
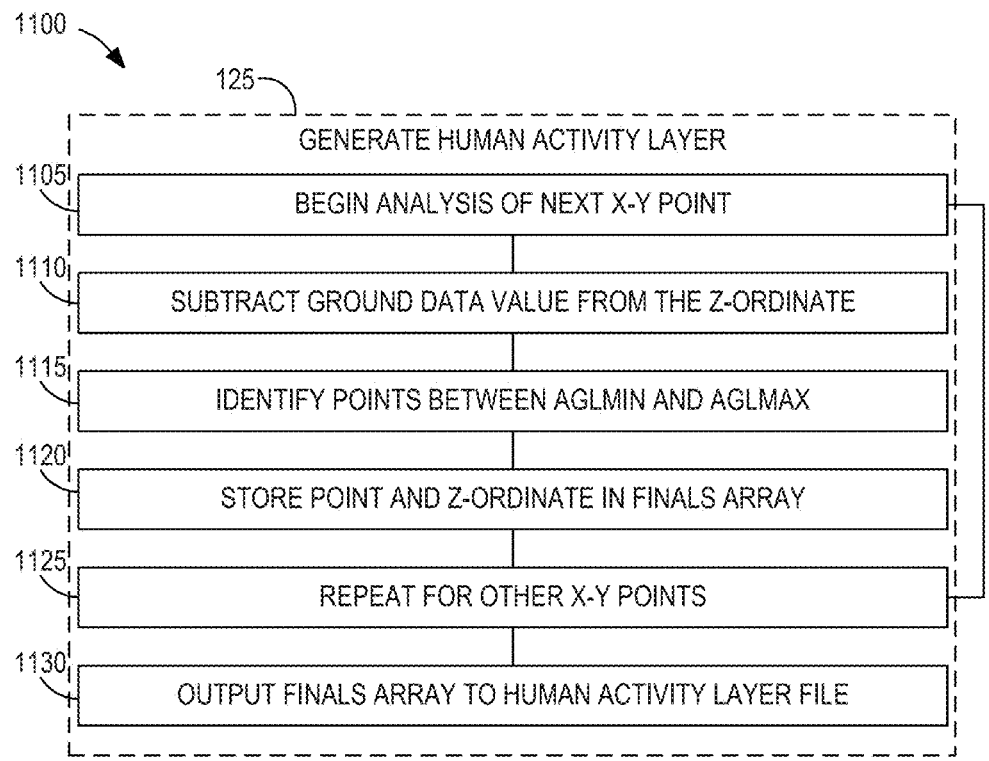
FIG. 11 shows a flow chart of generating the human activity layer, according to an embodiment.

FIG. 11 shows a flow chart 1100 of generating the human activity layer 125, according to an embodiment. The human activity layer (HAL) may be understood as the points within the point cloud that are within a few meters of bare earth. To generate the HAL 125, each X and Y point may be analyzed 1105, and ground data may be subtracted from the Z ordinate of the point 1110. Points between AGLMIN and AGLMAX may be identified 1115, and each point and original Z ordinate may be stored in a finals array 1120. This HAL calculation 125 may be performed for additional X and Y points 1125, and the finals array containing points and associated Z ordinates may be output to a path file 1130.

Figure 12:
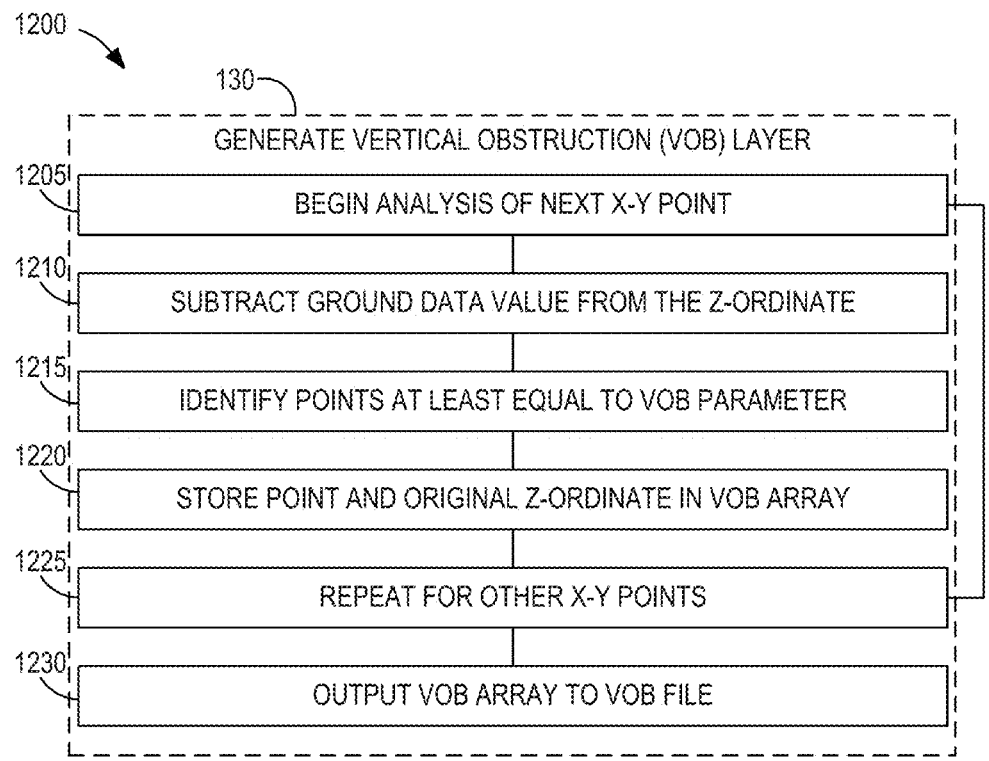
FIG. 12 shows a flow chart of generating vertical obstruction (VOB) layer, according to an embodiment.

FIG. 12 shows a flow chart 1200 of generating vertical obstruction (VOB) layer 130, according to an embodiment. A VOB parameter may be used to identify vertical obstructions. To generate the VOB layer 130, each X and Y point may be analyzed 1205, and ground data may be subtracted from the Z ordinate of the point 1210. Points greater than or equal to the VOB parameter may be identified 1215, and each point and original Z ordinate may be stored in a finals array 1220. This VOB layer calculation 130 may be performed for additional X and Y points 1225, and the finals array containing points and associated Z ordinates may be output to a VOB file 1230.

Figure 13:
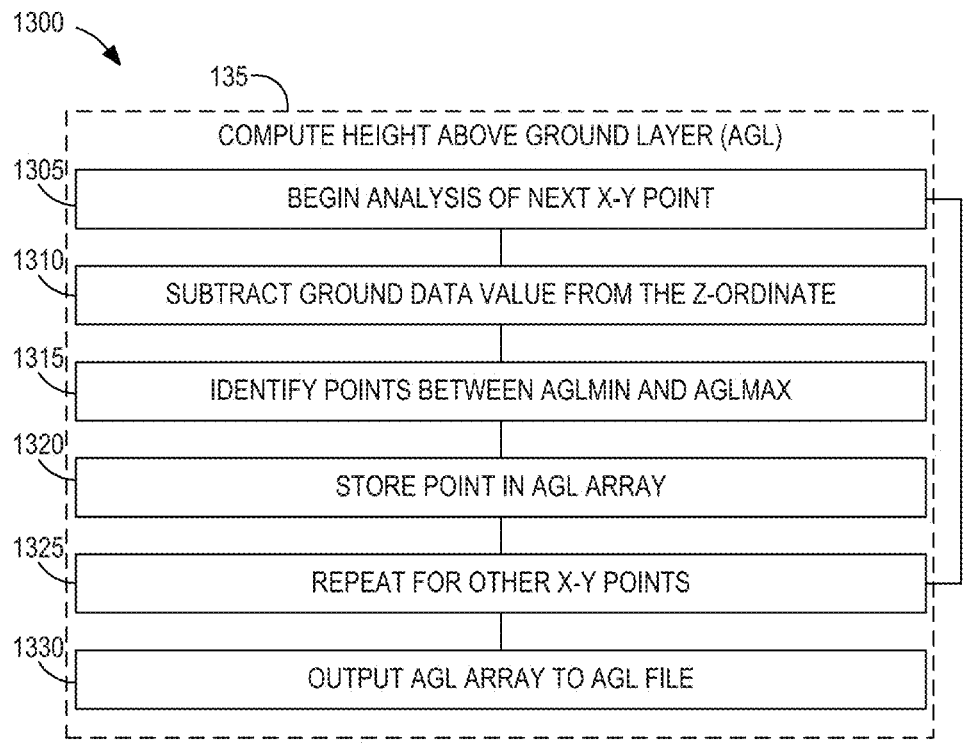
FIG. 13 shows a flow chart of computing height above ground layer (AGL), according to an embodiment.

FIG. 13 shows a flow chart 1300 of computing height above ground layer (AGL) 135, according to an embodiment. To generate the AGL 135, each X and Y point may be analyzed 1305, and ground data may be subtracted from the Z ordinate of the point 1310. Points between AGLMIN and AGLMAX may be identified 1315, and each point may be stored in an AGL array 1320. The AGL calculation 135 may be performed for additional X and Y points 1325, and the AGL array may be output to an AGL file 1330.

Figure 14:
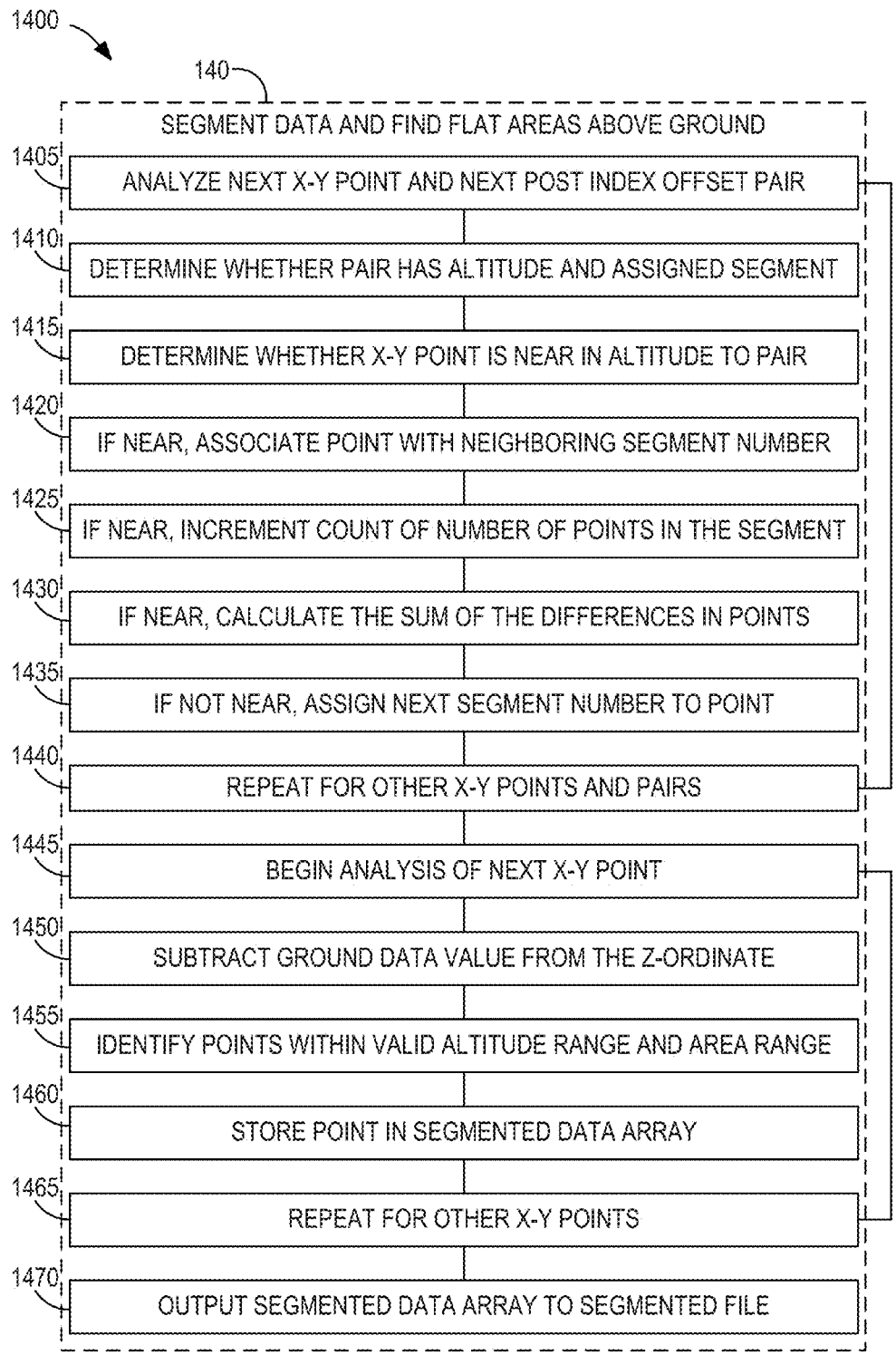
FIG. 14 shows a flow chart of segmenting data and finding flat areas above ground, according to an embodiment.

FIG. 14 shows a flow chart 1400 of segmenting data and finding flat areas above ground 140, according to an embodiment. Segmenting 140 may be performed for each X and Y pair and point index offset pairs 1405. Each post index offset pair may be analyzed to determine whether it has an altitude and associated segment 1410, and whether it is near in altitude to the X and Y pair 1420. If the post index offset pair has an altitude and segment and is near in altitude to the X and Y pair, the post index offset pair is associated with the neighboring segment number 1420, the number of points in the segment is incremented 1425, and the sum of the differences is calculated 1430. If the post index offset pair does not have an altitude and segment or is not near in altitude to the X and Y pair, the next segment number is assigned to the point 1435. This pair and post analysis is then repeated for other combinations of X and Y pairs and post index offset pairs 1440. Segmenting 140 may continue by analyzing each X and Y pair 1445. Ground data may be subtracted from the Z ordinate of the point 1450. Points within a valid altitude range and within a valid area range may be identified 1455, and each point may be stored in segmented data array 1460. Segmenting 140 may be performed for additional X and Y points 1465, and the segmented data array may be output to a segmented file 1430.

Figure 15:
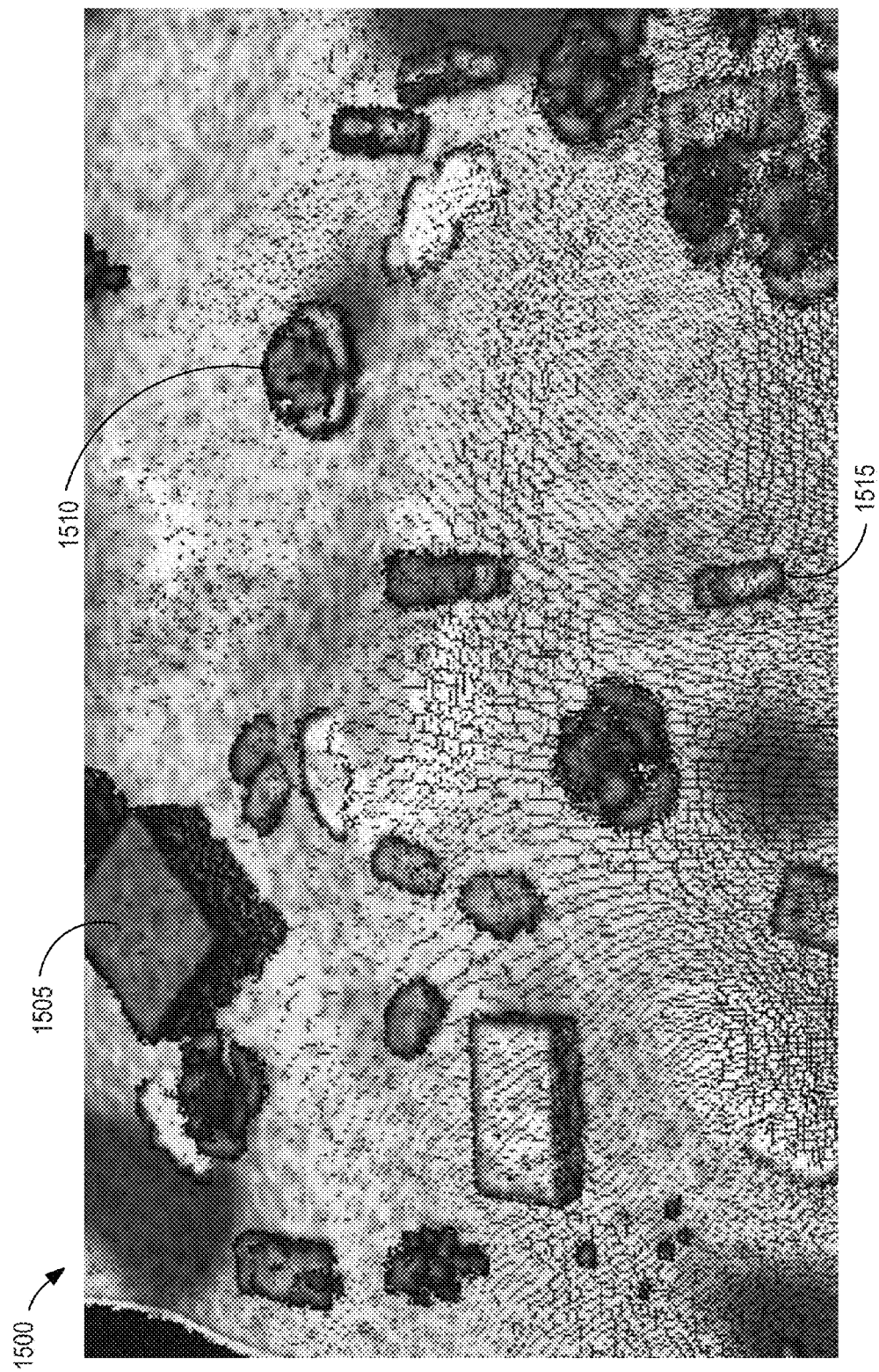
FIG. 15 shows a 2D image generated from a 3D point cloud, according to an embodiment.

FIG. 15 shows a 2D image generated from a 3D point cloud 1500, according to an embodiment. The first step for extraction of bare earth may be to convert the 3D point cloud into 2D images. The 2D image may be generated as described above with respect to flow chart 200 of the conversion of a 3D point cloud into multiple 2D images. The resultant 2D image may include one or more buildings 1505, trees 1510, or vehicles 1515. Though a black-and-white image is shown in this and the subsequent figures, varying colors, brightness levels, and other visual enhancements to show depth and other image features.

Figure 16:
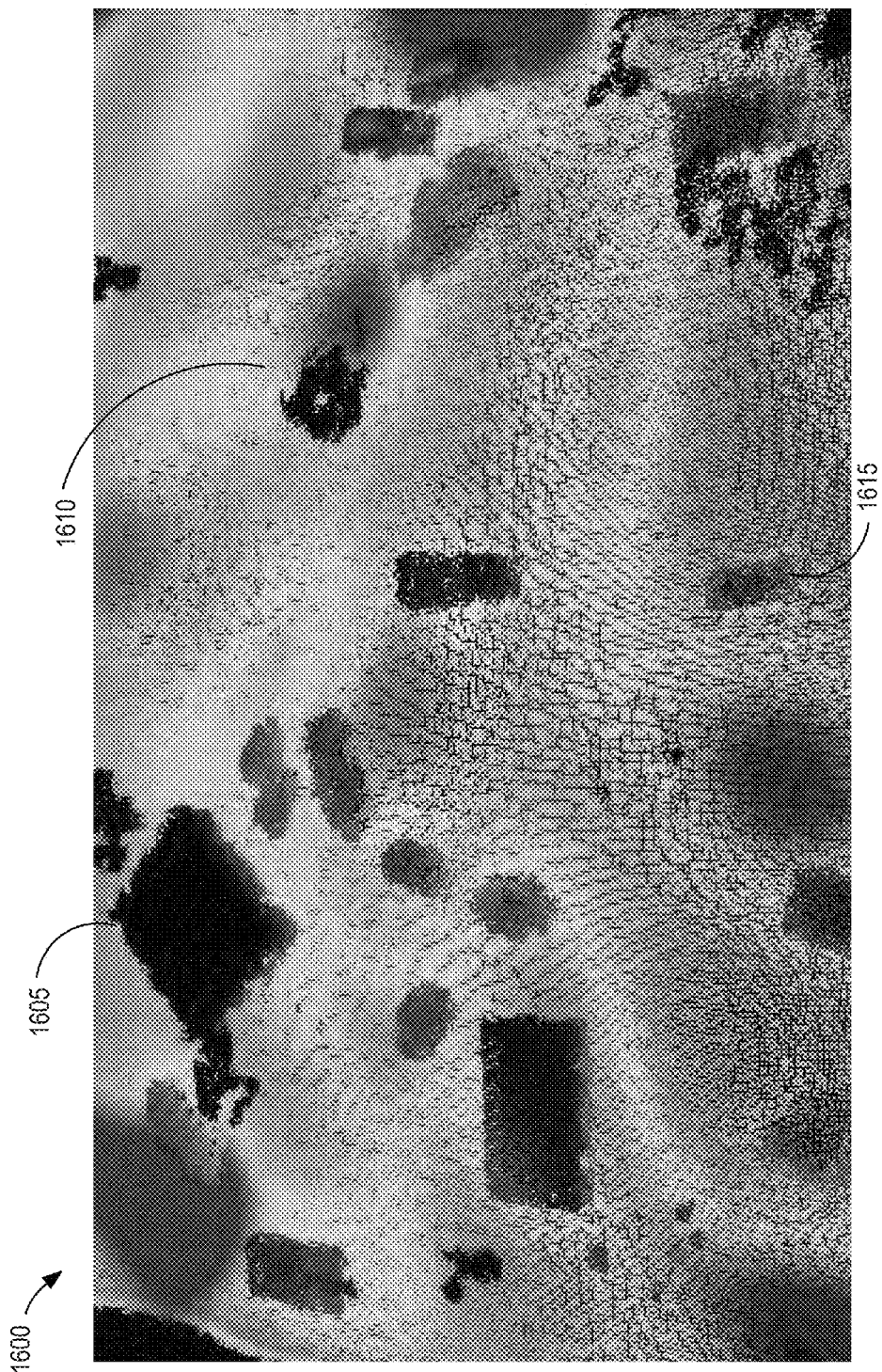
FIG. 16 shows a Human Activity Layer (HAL), according to an embodiment.

FIG. 16 shows a Human Activity Layer (HAL) 1600, according to an embodiment. The HAL 1600 may be understood as the points within the point cloud that are within a few meters of bare earth. To improve visibility, the HAL includes a higher intensity near the ground, and lower intensity farther above the ground. The HAL may be generated as described above with respect to flow chart 1100. For example, an above ground layer (AGL) minimum (AGLMIN) and maximum (AGLMAX) may be identified, and points between AGLMIN and AGLMAX may be stored to an array. The resultant HAL 1600 may visually draw attention to various items shown in the original 2D image, including one or more buildings 1605, trees 1610, or vehicles 1615.

Figure 17:
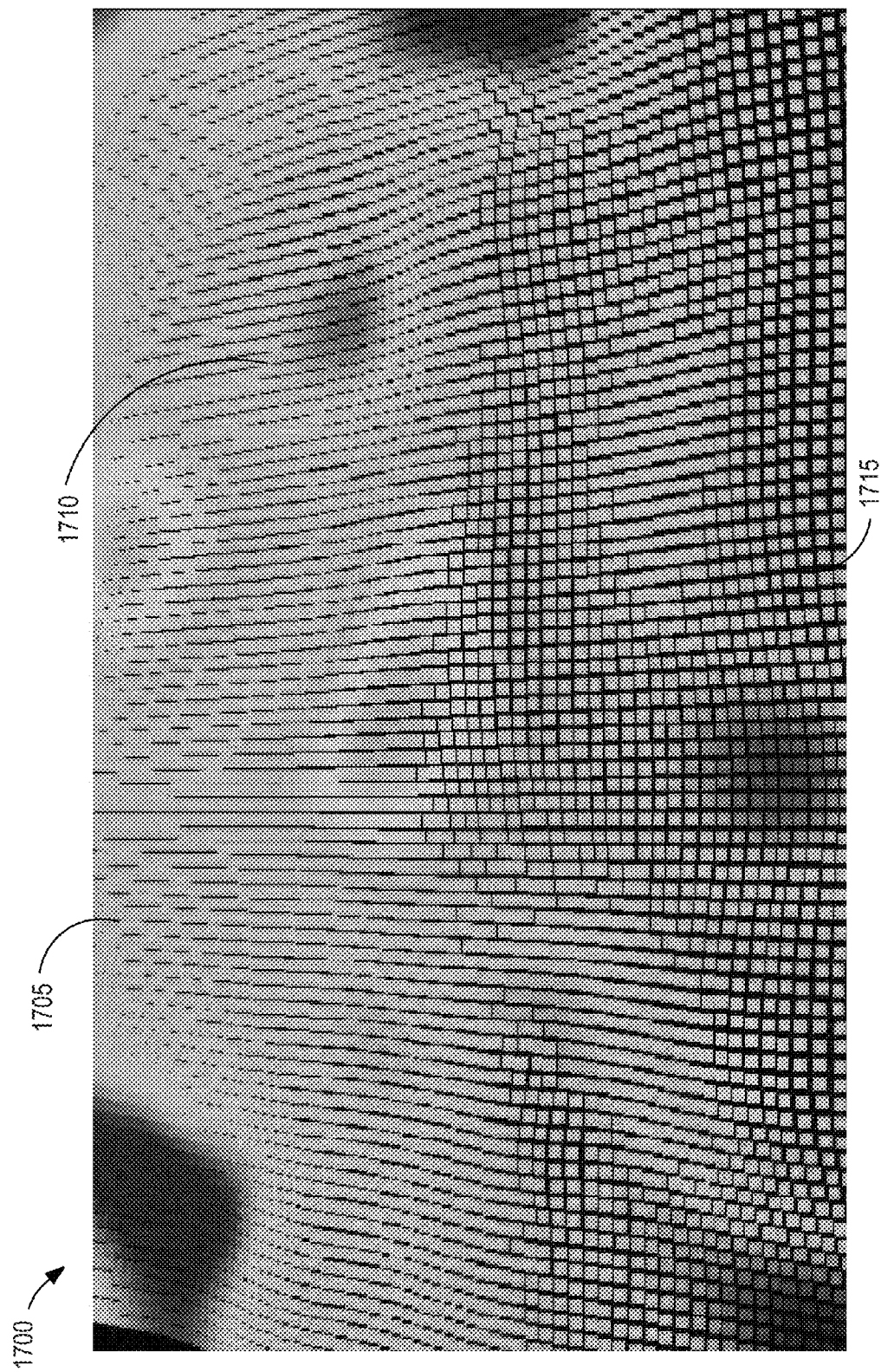
FIG. 17 shows a derived bare earth output, according to an embodiment.

FIG. 17 shows a derived bare earth output 1700, according to an embodiment. The bare earth output 1700 may be generated as described above with respect to flow chart 100. In addition to conversion to a 2D image shown in FIG. 15 and the HAL output shown in FIG. 16, the bare earth output 1700 may include determining height above ground, data segmentation, and flat area determination. The resultant bare earth output 1700 may show the bare earth, including showing bare earth in locations corresponding to one or more buildings 1705, trees 1710, or vehicles 1715.

Figure 18:
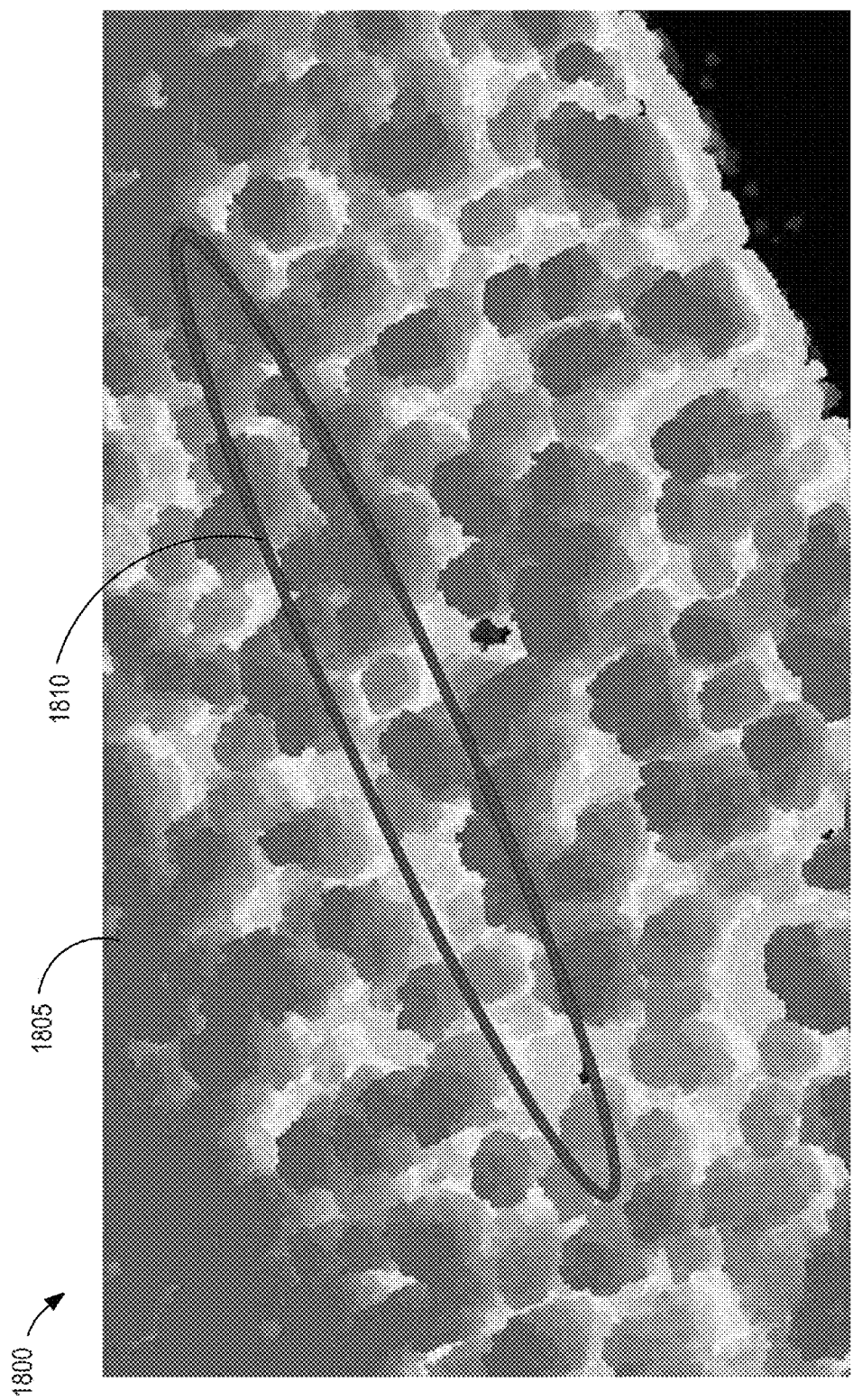
FIG. 18 shows an unanalyzed path image before applying path detection, according to an embodiment.

FIG. 18 shows an unanalyzed path image 1800 before applying path detection, according to an embodiment. Path detection may be performed on a 2D image of heavy foliage that includes one or more trees 1805. The 2D image of heavy foliage may include one or more hidden paths. A hidden path area 1810 may not be visible within the 2D image of heavy foliage, but may be extracted and shown as in FIG. 19.

Figure 19:
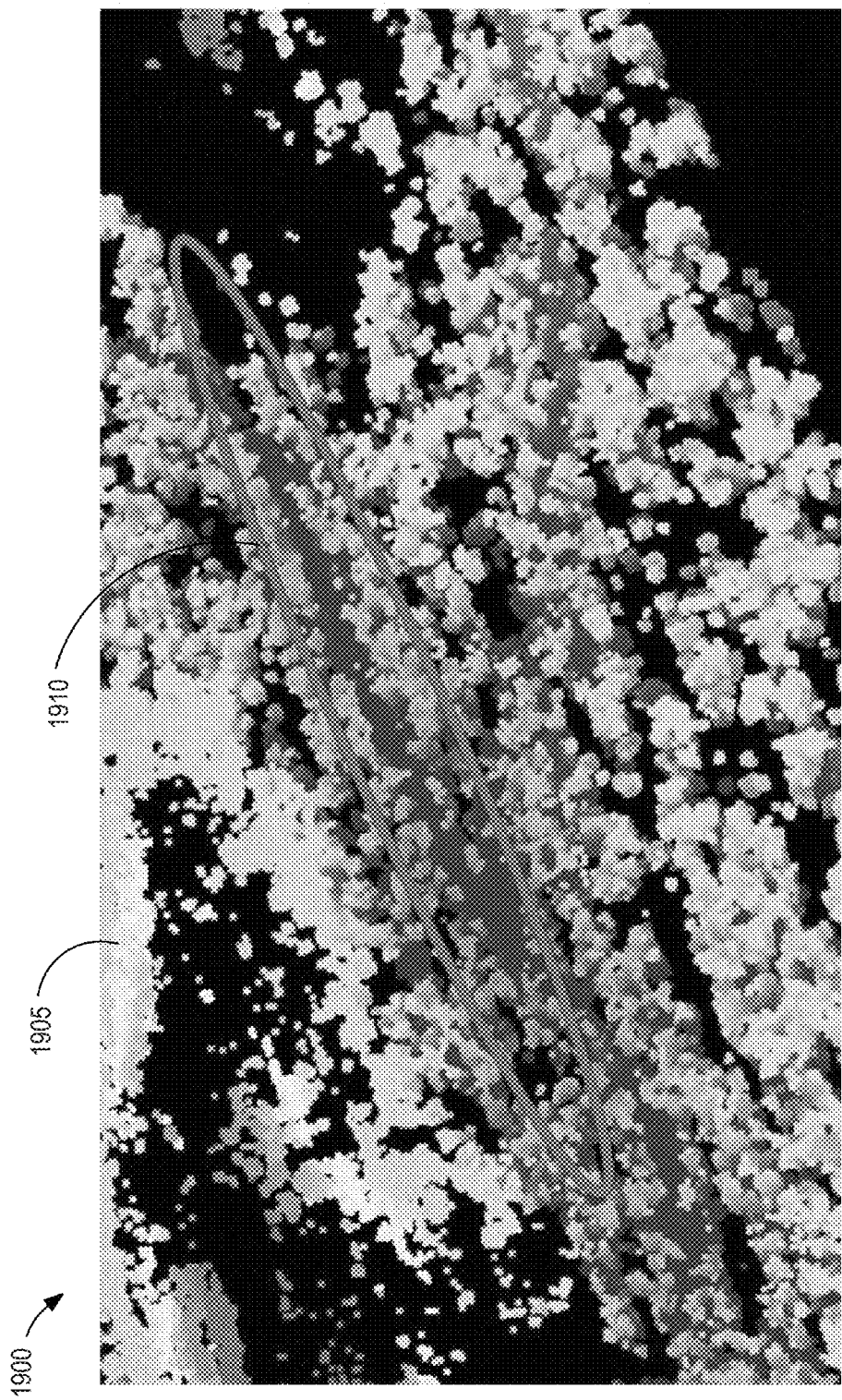
FIG. 19 shows an analyzed path image after applying path detection, according to an embodiment.

FIG. 19 shows an analyzed path image 1900 after applying path detection, according to an embodiment. Path detection may be performed on a 2D image of heavy foliage, such as is shown in FIG. 18. Path detection may include identifying paths and generating the inverse above ground layer AGL as described in flow chart 1000. The resultant analyzed path image 1900 may include visual representations of the foliage 1905, and linear areas with less foliage 1910 may be identified as a potential hidden path. Paths may be highlighted by adjusting the intensity of the colors or shading within analyzed path image 1900 according to the inverse AGL, which may result in cleared areas showing up within the analyzed path image 1900 as brighter regions.

Figure 20:
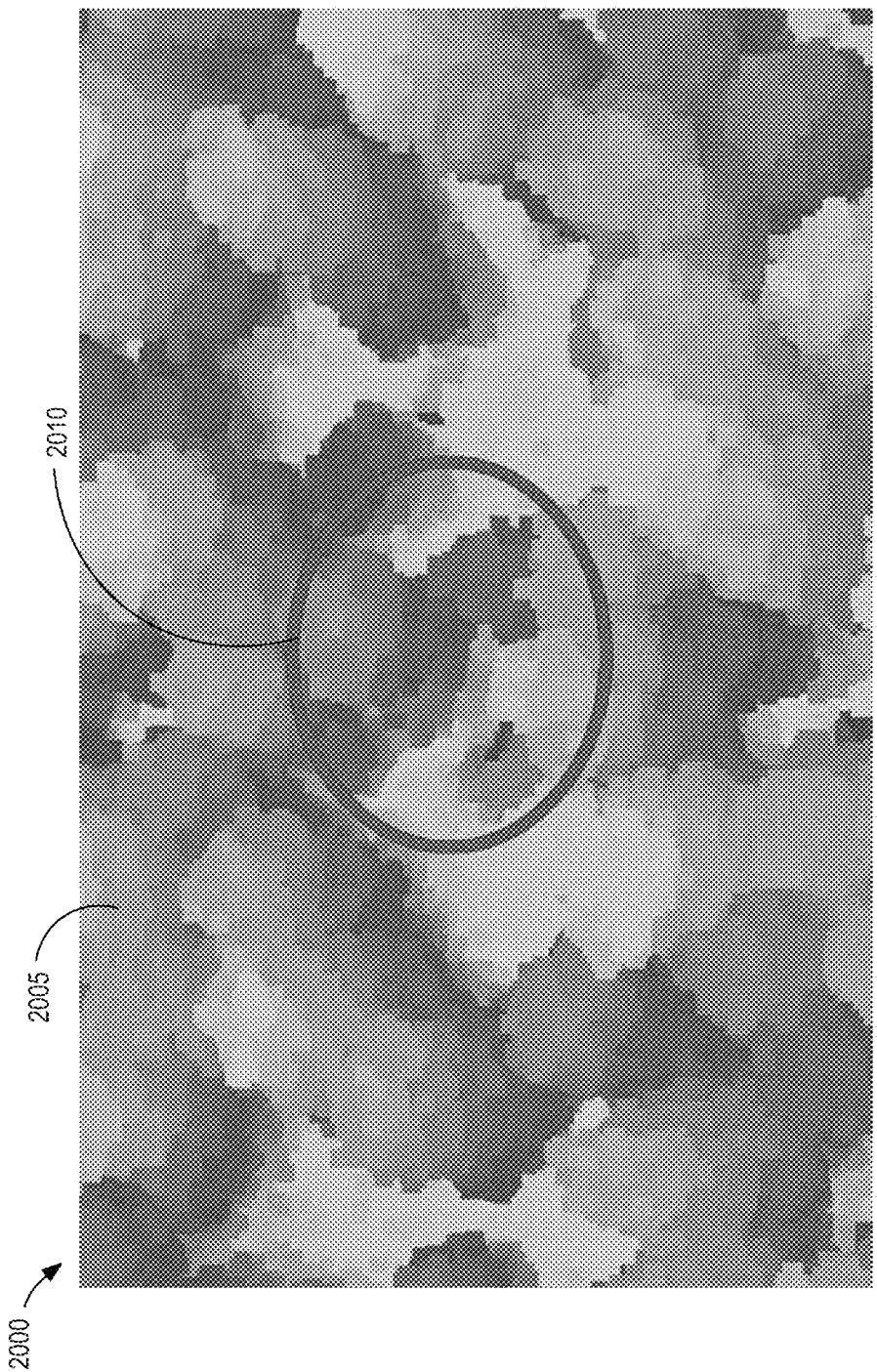
FIG. 20 shows a 2D obscured building image before applying building detection, according to an embodiment.

FIG. 20 shows a 2D obscured building image 2000 before applying building detection, according to an embodiment. Building detection may be performed on a 2D image of heavy foliage that includes one or more trees 2005. The 2D image of heavy foliage may include one or more hidden buildings. A hidden building area 2010 may not be visible within the 2D image of heavy foliage, but may be extracted and shown as in FIG. 21.

Figure 21:
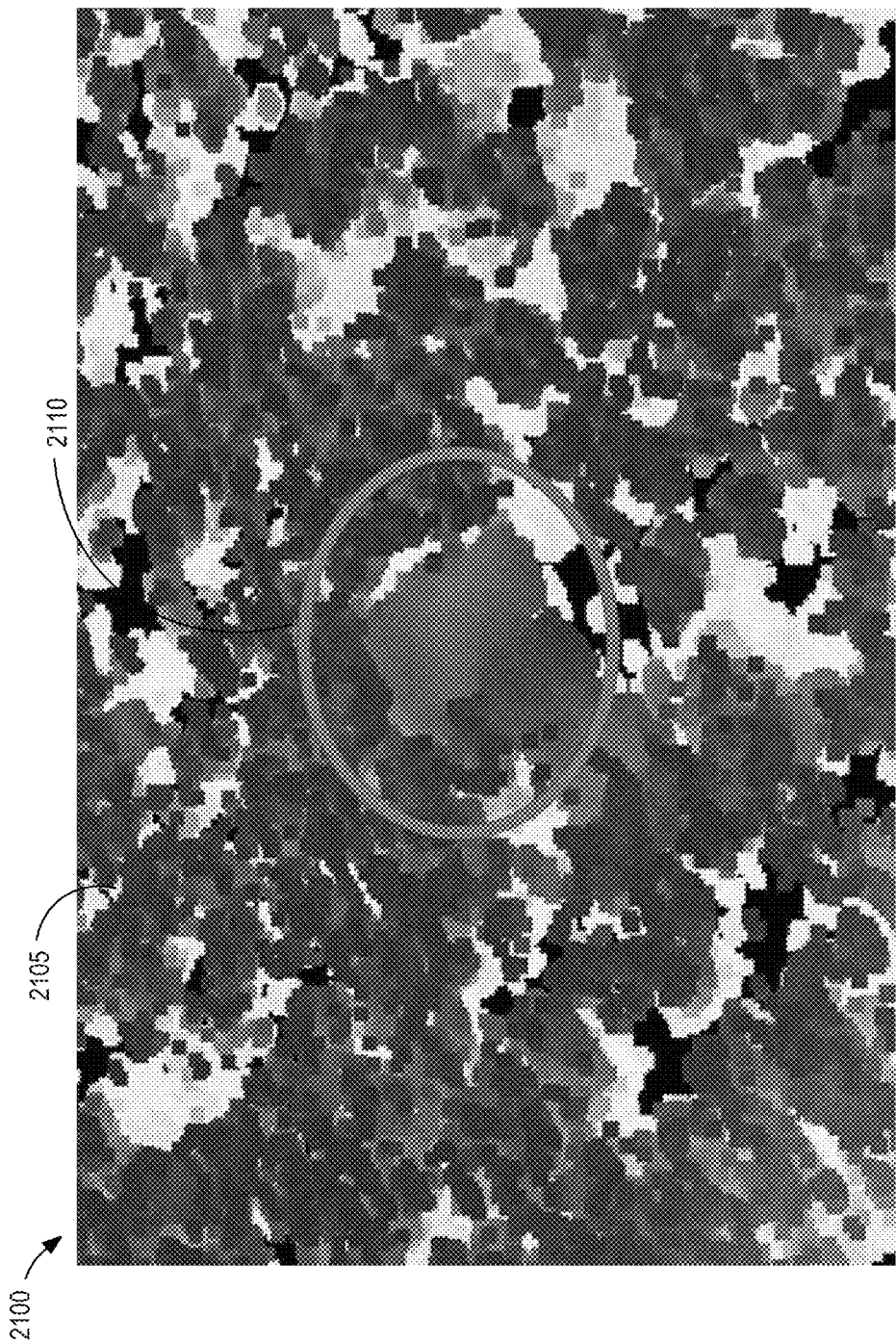
FIG. 21 shows a 2D revealed building image after applying building detection, according to an embodiment.

FIG. 21 shows a 2D revealed building image 2100 after applying building detection, according to an embodiment. Building detection may be performed on a 2D image of heavy foliage, such as is shown in FIG. 20. Building detection may include generated the HAL as described above in flow chart 1100. The resultant revealed building image 2100 may include visual representations of the foliage 2105, and regions including a consistent color or shading 2110 may be identified as a potential hidden building. Buildings may be isolated using the HAL by adjusting the intensity of the colors or shading to correspond to flat objects, which may result in buildings appearing as brighter regions. Similarly, the intensity of the colors or shading to represent altitude, which may result in flat earth contours and structures being displayed relative to the minimum altitude. Additionally, a minimum or maximum altitude may be applied to the intensity of the colors or shading, which may result in an image that displays structures of similar heights.

Figure 22:
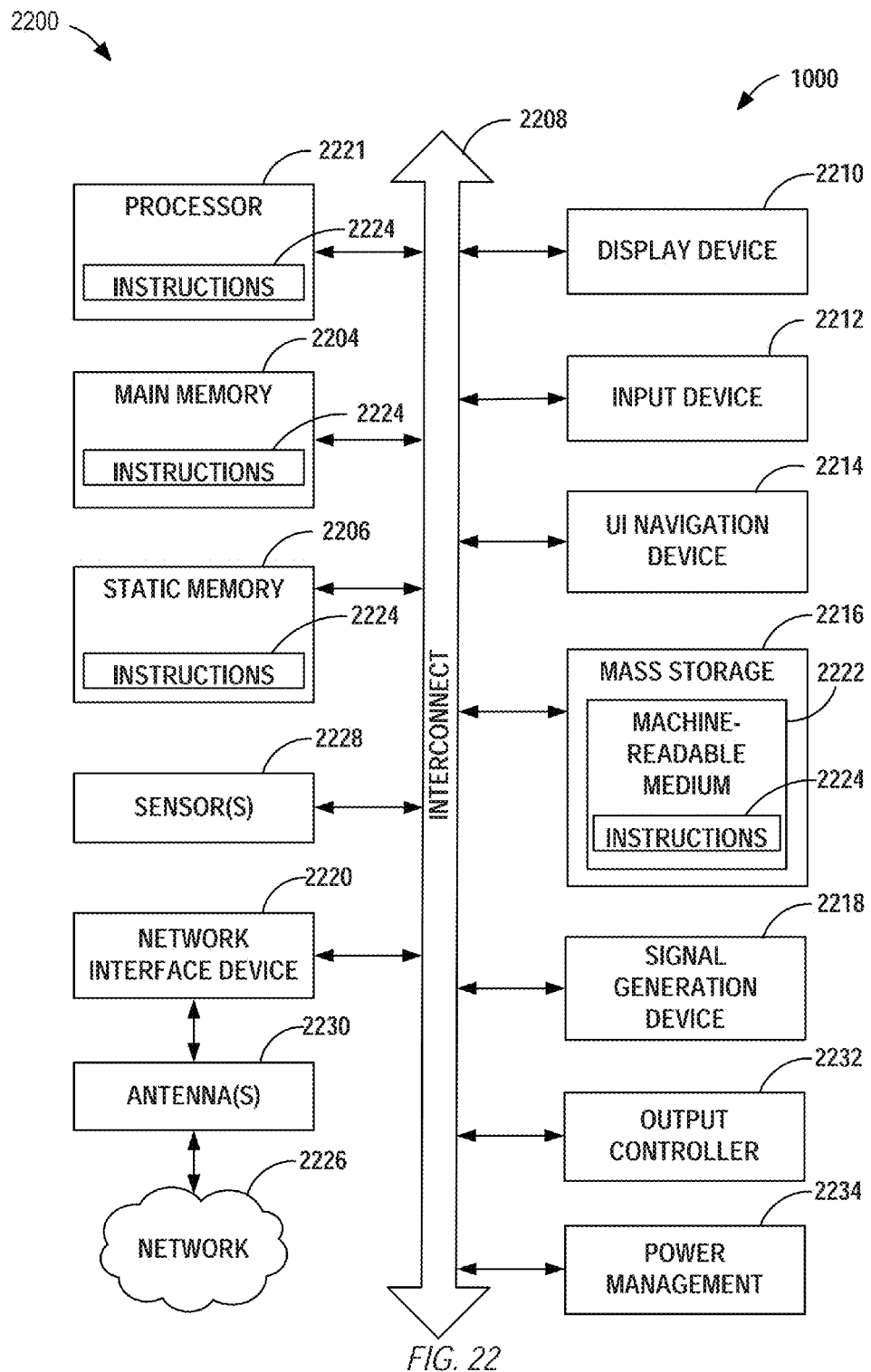
FIG. 22 shows an example of a computer system.

FIG. 22 is a block diagram illustrating an example computer system 2200 machine which can include a reusable core panel discussed herein. Computer system 2200 may be a computing device. In an example, the machine can operate as a standalone device or may be connected (e.g., via a cellular network) to other machines. In a networked deployment, the machine can operate in the capacity of either a server or a client machine in server-client network environments, or it can act as a peer machine in peer-to-peer (or distributed) network environments. Further, while only a single machine is illustrated, the term "machine" shall also be taken to include any collection of machines that individually or jointly execute a set (or multiple sets) of instructions to perform any one or more of the methodologies discussed herein.

Example computer system 2200 can include a processor 2202 (e.g., a Central Processing Unit (CPU), a Graphics Processing Unit (GPU) or both), a main memory 2204 and a static memory 2206, which communicate with each other via an interconnect 2208 (e.g., a link, a bus, etc.). The computer system 2200 can further include a video display unit 2210, an alphanumeric input device 2212 (e.g., a keyboard), and a User Interface (UI) navigation device 2214 (e.g., a mouse). In an example, the video display unit 2210, input device 2212 and UI navigation device 2214 are a touch screen display. The computer system 2200 can additionally include a storage device 2216 (e.g., a drive unit), a signal generation device 2218 (e.g., a speaker), an output controller 2232, a power management controller 2234, and a network interface device 2220 (which can include or operably communicate with one or more antennas 2230, transceivers, or other wireless communications hardware), and one or more sensors 2228, such as a GPS sensor, compass, location sensor, accelerometer, or other sensor.

The storage device 2216 can include a machine-readable medium 2222 on which may be stored one or more sets of data structures and instructions 2224 (e.g., software) embodying or utilized by any one or more of the methodologies or functions described herein. The instructions 2224 can also reside, completely or at least partially, within the main memory 2204, static memory 2206, or within the processor 2202 during execution thereof by the computer system 2200, with the main memory 2204, static memory 2206, and the processor 2202 also constituting machine-readable media.

While the machine-readable medium 2222 is illustrated in an example embodiment to be a single medium, the term "machine-readable medium" can include a single medium or multiple media (e.g., a centralized or distributed database, and/or associated caches and servers) that store the one or more instructions 2224. The term "machine-readable medium" shall also be taken to include any tangible medium that may be capable of storing, encoding or carrying instructions for execution by the machine and that cause the machine to perform any one or more of the methodologies of the present disclosure or that may be capable of storing, encoding or carrying data structures utilized by or associated with such instructions. The term "machine-readable medium" shall accordingly be taken to include, but not be limited to, solid-state memories, optical media, and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 2224 can further be transmitted or received over a network (e.g., a distributed or hybrid distributed and centralized cellular network) using a transmission medium via the network interface device 2220 utilizing any one of a number of well-known transfer protocols (e.g., OFDMA, SC-FDMA, TDMA, TDMA, CDMA, or other channel access method). The term "transmission medium" shall be taken to include any intangible medium that may be capable of storing, encoding, or carrying instructions for execution by the machine, and includes digital or analog communications signals or other intangible medium to facilitate communication of such software.

EXAMPLES AND NOTES

The present subject matter may be described by way of several examples. Example 1 may include a method for generating a bare Earth image, the method comprising identifying a plurality of ground points from a three-dimensional point cloud using localized histogramming, converting the plurality of three-dimensional ground points into a two-dimensional altitude intensity grid, identifying a plurality of isolated points from the plurality of ground points, and generating a bare earth image by removing the plurality of isolated points from the plurality of ground points.

Example 2 may include the subject matter of example 1, wherein converting a plurality of three-dimensional points into a two-dimensional altitude intensity grid includes removing a minimum bias from the plurality of three-dimensional points, scaling the plurality of three-dimensional points by an image resolution to generate a plurality of scaled points, identifying a minimum altitude from the plurality of scaled points, removing a plurality of extraneous points below the minimum altitude from the plurality of scaled points, and generating a two-dimensional altitude intensity grid from the plurality of scaled points.

Example 3 may include the subject matter of any of examples 1-2, further including identifying and removing buildings, wherein identifying and removing buildings includes generating a height difference grid including a plurality of height difference grid points, each height difference grid point representing a difference between each altitude intensity grid point and each adjacent altitude intensity grid point in a first direction along a first axis within the two-dimensional altitude intensity grid, and removing height difference grid points from the height difference grid that exceed a selected building removal threshold.

Example 4 may include the subject matter of any of examples 1-2, further including performing height averaging for a subset of points within the two-dimensional altitude intensity grid, wherein performing height averaging includes generating a first reduced height subset by removing at least one excessive height point within the subset of points, the at least one excessive height point exceeding a maximum vertical difference threshold, and determining an first average subset height by dividing a sum of the first reduced height subset by a number of points within the first reduced height subset.

Example 5 may include the subject matter of any of examples 1-4, wherein performing height averaging further includes generating a second reduced height subset by removing at least one excessive relative vertical difference point within the subset of points, the at least one excessive relative vertical difference point exceeding a maximum vertical difference threshold with respect to at least one adjacent point within the subset of points, generating a third reduced height subset by removing at least one remote point within the subset of points, the at least one remote point exceeding a maximum horizontal difference threshold with respect to at least one adjacent point within the subset of points, and determining a second average subset height by dividing a sum of the third reduced height subset by a number of points within the third reduced height subset.

Example 6 may include the subject matter of example 1, wherein localized histogramming includes identifying a probability distribution of a subset of three-dimensional points, wherein the probability distribution includes a plurality of altitude bins, and wherein each altitude bin has an associated altitude and an associated probability, identifying a maximum histogram value within the probability distribution, identifying a root mean square value within the probability distribution, identifying a threshold as the greater of one-fifth of the maximum histogram value or twice the root mean square value, identifying a lowest altitude bin within the probability distribution that meets the threshold, identifying a nearby altitude bin, wherein the nearby altitude bin has an associated altitude that is higher than the altitude associated with the lowest altitude bin, and wherein the altitude associated with the nearby altitude bin is within a selected altitude difference of the lowest altitude bin, comparing the associated probability of the lowest altitude bin with the associated probability of the nearby altitude bin, and identifying a preferred altitude bin between the lowest altitude bin and the nearby altitude bin as having a greater associated probability.

Example 7 may include the subject matter of example 1, wherein identifying a plurality of isolated points from the plurality of ground points includes identifying a possible isolated ground point from the plurality of ground points, each of the ground points having an associated ground point altitude, identifying a quantity of nearby points from the plurality of ground points, where the nearby points have an associated altitude within a selected altitude difference, and identifying, when the quantity of nearby points falls below a selected altitude grouping threshold, a confirmed isolated ground point.

Example 8 may include the subject matter of example 1, further including identifying a vertical obstruction from the two-dimensional altitude intensity grid, interpolating a plurality of obstructed ground points, and generating an unobstructed ground image from the plurality of obstructed ground points.

Example 9 may include the subject matter of example 1, further including extracting a path map from the three-dimensional points within a selected altitude difference of the plurality of ground points.

Example 10 may include the subject matter of example 1, further including generating an inverse Above Ground Level (AGL) image from the three-dimensional points within a selected altitude difference of the plurality of ground points.

Example 11 may include the subject matter of example 1, further including extracting a plurality of Human Activity Layer (HAL) points from the three-dimensional points within a selected altitude difference of the plurality of ground points, and generating an HAL image from the plurality of HAL points.

Example 12 may include the subject matter of example 1, wherein the three-dimensional point cloud includes Geiger-mode avalanche photodiode (GmAPD) light radar (LiDAR) data generated from a short light amplification by stimulated emission of radiation (LASER) pulse.

Example 13 may include an electronic device comprising a processor configured to identify a plurality of ground points from a three-dimensional point cloud using localized histogramming convert the plurality of three-dimensional ground points into a two-dimensional altitude intensity grid identify a plurality of isolated points from the plurality of ground points, and generate a bare earth image by removing the plurality of isolated points from the plurality of ground points.

Example 14 may include the electronic device of example 13, wherein the processor is further configured to identify and remove buildings, wherein to convert a plurality of three-dimensional points into a two-dimensional altitude intensity grid includes removing a minimum bias from the plurality of three-dimensional points scaling the plurality of three-dimensional points by an image resolution to generate a plurality of scaled points identifying a minimum altitude from the plurality of scaled points removing a plurality of extraneous points below the minimum altitude from the plurality of scaled points, and generating a two-dimensional altitude intensity grid from the plurality of scaled points.

Example 15 may include the electronic device of example 13, wherein the processor is further configured to perform height averaging for a subset of points within the two-dimensional altitude intensity grid, wherein to perform height averaging includes generating a first reduced height subset by removing at least one excessive height point within the subset of points, the at least one excessive height point exceeding a maximum vertical difference threshold determining an first average subset height by dividing a sum of the first reduced height subset by a number of points within the first reduced height subset generating a second reduced height subset by removing at least one excessive relative vertical difference point within the subset of points, the at least one excessive relative vertical difference point exceeding a maximum vertical difference threshold with respect to at least one adjacent point within the subset of points generating a third reduced height subset by removing at least one remote point within the subset of points, the at least one remote point exceeding a maximum horizontal difference threshold with respect to at least one adjacent point within the subset of points, and determining a second average subset height by dividing a sum of the third reduced height subset by a number of points within the third reduced height subset.

Example 16 may include the electronic device of example 13, wherein to identify a plurality of ground points from a three-dimensional point cloud using localized histogramming includes identifying a probability distribution of a subset of three-dimensional points, wherein the probability distribution includes a plurality of altitude bins, and wherein each altitude bin has an associated altitude and an associated probability identifying a maximum histogram value within the probability distribution identifying a root mean square value within the probability distribution identifying a threshold as the greater of one-fifth of the maximum histogram value or twice the root mean square value identifying a lowest altitude bin within the probability distribution that meets the threshold identifying a nearby altitude bin, wherein the nearby altitude bin has an associated altitude that is higher than the altitude associated with the lowest altitude bin, and wherein the altitude associated with the nearby altitude bin is within a selected altitude difference of the lowest altitude bin, comparing the associated probability of the lowest altitude bin with the associated probability of the nearby altitude bin, and identifying a preferred altitude bin between the lowest altitude bin and the nearby altitude bin as having a greater associated probability.

Example 17 may include a non-transitory machine-readable medium including instructions, which when executed by the machine, cause the machine to perform operations comprising identifying a plurality of ground points from a three-dimensional point cloud using localized histogramming converting the plurality of three-dimensional ground points into a two-dimensional altitude intensity grid identifying a plurality of isolated points from the plurality of ground points, and generating a bare earth image by removing the plurality of isolated points from the plurality of ground points.

Example 18 may include the machine-readable medium of example 17, wherein identifying and removing buildings includes generating a height difference grid including a plurality of height difference grid points, each height difference grid point representing a difference between each altitude intensity grid point and each adjacent altitude intensity grid point in a first direction along a first axis within the two-dimensional altitude intensity grid, and removing height difference grid points from the height difference grid that exceed a selected building removal threshold.

Example 19 may include the machine-readable medium of example 17, wherein the instructions cause the machine to perform operations including identifying a vertical obstruction from the two-dimensional altitude intensity grid interpolating a plurality of obstructed ground points, and generating an unobstructed ground image from the plurality of obstructed ground points.

Example 20 may include the machine-readable medium of example 17, wherein the instructions cause the machine to perform operations including extracting a plurality of Human Activity Layer (HAL) points from the three-dimensional points within a selected altitude difference of the plurality of ground points, and generating an HAL image from the plurality of HAL points.

The above detailed description includes references to the accompanying drawings, which form a part of the detailed description. The drawings show, by way of illustration, specific embodiments in which methods, apparatuses, and systems discussed herein may be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A method for generating a bare Earth image, the method comprising:
    removing a minimum bias from a plurality of three-dimensional points within a three-dimensional point cloud;
    scaling the plurality of three-dimensional points by an image resolution to generate a plurality of scaled points;
    identifying a minimum altitude from the plurality of scaled points;
    removing a plurality of extraneous points below the minimum altitude from the plurality of scaled points;
    generating a two-dimensional altitude intensity grid from the plurality of scaled points;
    identifying a plurality of ground points from the two-dimensional altitude intensity grid using localized histogramming;
    identifying a plurality of isolated points from the plurality of ground points; and
    generating a bare earth image by removing the plurality of isolated points from the plurality of ground points.

2. The method of claim 1, further including identifying and removing buildings, wherein identifying and removing buildings includes:
    generating a height difference grid including a plurality of height difference grid points, each height difference grid point representing a difference between each altitude intensity grid point and each adjacent altitude intensity grid point in a first direction along a first axis within the two-dimensional altitude intensity grid; and
    removing height difference grid points from the height difference grid that exceed a selected building removal threshold.

3. The method of claim 2, further including performing height averaging for a subset of points within the two-dimensional altitude intensity grid, wherein performing height averaging includes:
generating a first reduced height subset by removing at least one excessive height point within the subset of points, the at least one excessive height point exceeding a maximum vertical difference threshold; and
determining an first average subset height by dividing a sum of the first reduced height subset by a number of points within the first reduced height subset.

4. The method of claim 3, wherein performing height averaging further includes:
generating a second reduced height subset by removing at least one excessive relative vertical difference point within the subset of points, the at least one excessive relative vertical difference point exceeding a maximum vertical difference threshold with respect to at least one adjacent point within the subset of points;
generating a third reduced height subset by removing at least one remote point within the subset of points, the at least one remote point exceeding a maximum horizontal difference threshold with respect to at least one adjacent point within the subset of points; and
determining a second average subset height by dividing a sum of the third reduced height subset by a number of points within the third reduced height subset.

5. The method of claim 1, wherein localized histogramming includes:
identifying a probability distribution of a subset of three-dimensional points, wherein the probability distribution includes a plurality of altitude bins, and wherein each altitude bin has an associated altitude and an associated probability;
identifying a maximum histogram value within the probability distribution;
identifying a root mean square value within the probability distribution;
identifying a threshold as the greater of one-fifth of the maximum histogram value or twice the root mean square value;
identifying a lowest altitude bin within the probability distribution that meets the threshold;
identifying a nearby altitude bin, wherein the nearby altitude bin has an associated altitude that is higher than the altitude associated with the lowest altitude bin, and wherein the altitude associated with the nearby altitude bin is within a selected altitude difference of the lowest altitude bin;
comparing the associated probability of the lowest altitude bin with the associated probability of the nearby altitude bin; and
identifying a preferred altitude bin between the lowest altitude bin and the nearby altitude bin as having a greater associated probability.

6. The method of claim 1, wherein identifying a plurality of isolated points from the plurality of ground points includes:
identifying a possible isolated ground point from the plurality of ground points, each of the ground points having an associated ground point altitude;
identifying a quantity of nearby points from the plurality of ground points, where the nearby points have an associated altitude within a selected altitude difference; and
identifying, when the quantity of nearby points falls below a selected altitude grouping threshold, a confirmed isolated ground point.

7. The method of claim 1, further including:
identifying a vertical obstruction from the two-dimensional altitude intensity grid;
interpolating a plurality of obstructed ground points; and
generating an unobstructed ground image from the plurality of obstructed ground points.

8. The method of claim 1, further including extracting a path map from the three-dimensional points within a selected altitude difference of the plurality of ground points.

9. The method of claim 1, further including generating an inverse Above Ground Level (AGL) image from the three-dimensional points within a selected altitude difference of the plurality of ground points.

10. The method of claim 1, further including:
extracting a plurality of Human Activity Layer (HAL) points from the three-dimensional points within a selected altitude difference of the plurality of ground points; and
generating an HAL image from the plurality of HAL points.

11. The method of claim 1, wherein the three-dimensional point cloud includes Geiger-mode avalanche photodiode (GmAPD) light radar (LiDAR) data generated from a short light amplification by stimulated emission of radiation (LASER) pulse.

12. An electronic device comprising a processor configured to:
remove a minimum bias from a plurality of three-dimensional points within a three-dimensional point cloud;
scale the plurality of three-dimensional points by an image resolution to generate a plurality of scaled points;
identify a minimum altitude from the plurality of scaled points;
remove a plurality of extraneous points below the minimum altitude from the plurality of scaled points;
generate a two-dimensional altitude intensity grid from the plurality of scaled points;
identify a plurality of ground points from the two-dimensional altitude intensity grid using localized histogramming;
identify a plurality of isolated points from the plurality of ground points; and
generate a bare earth image by removing the plurality of isolated points from the plurality of ground points.

13. The electronic device of claim 12, wherein the processor is further configured to perform height averaging for a subset of points within the two-dimensional altitude intensity grid, wherein to perform height averaging includes:
generating a first reduced height subset by removing at least one excessive height point within the subset of points, the at least one excessive height point exceeding a maximum vertical difference threshold;
determining an first average subset height by dividing a sum of the first reduced height subset by a number of points within the first reduced height subset;
generating a second reduced height subset by removing at least one excessive relative vertical difference point within the subset of points, the at least one excessive relative vertical difference point exceeding a maximum vertical difference threshold with respect to at least one adjacent point within the subset of points;
generating a third reduced height subset by removing at least one remote point within the subset of points, the at least one remote point exceeding a maximum horizontal difference threshold with respect to at least one adjacent point within the subset of points; and determining a second average subset height by dividing a sum of the third reduced height subset by a number of points within the third reduced height subset.

14. The electronic device of claim 12, wherein to identify a plurality of ground points from a three-dimensional point cloud using localized histogramming includes:
- identifying a probability distribution of a subset of three-dimensional points, wherein the probability distribution includes a plurality of altitude bins, and wherein each altitude bin has an associated altitude and an associated probability;
- identifying a maximum histogram value within the probability distribution;
- identifying a root mean square value within the probability distribution;
- identifying a threshold as the greater of one-fifth of the maximum histogram value or twice the root mean square value;
- identifying a lowest altitude bin within the probability distribution that meets the threshold;
- identifying a nearby altitude bin, wherein the nearby altitude bin has an associated altitude that is higher than the altitude associated with the lowest altitude bin, and wherein the altitude associated with the nearby altitude bin is within a selected altitude difference of the lowest altitude bin;
- comparing the associated probability of the lowest altitude bin with the associated probability of the nearby altitude bin; and
- identifying a preferred altitude bin between the lowest altitude bin and the nearby altitude bin as having a greater associated probability.

15. A non-transitory machine-readable medium including instructions, which when executed by the machine, cause the machine to perform operations comprising:
- identifying a plurality of ground points from a three-dimensional point cloud using localized histogramming;
- converting the plurality of three-dimensional ground points into a two-dimensional altitude intensity grid;
- identifying a plurality of isolated points from the plurality of ground points; and
- identifying a plurality of building points from the plurality of ground points, the identifying the plurality of building points including:
  - generating a height difference grid including a plurality of height difference grid points, each height difference grid point representing a difference between each altitude intensity grid point and each adjacent altitude intensity grid point in a first direction along a first axis within the two-dimensional altitude intensity grid; and
  - removing height difference grid points from the height difference grid that exceed a selected building removal threshold; and
- generating a bare earth image by removing the plurality of isolated points and the plurality of building points from the plurality of ground points.

16. The machine-readable medium of claim 15, wherein the instructions cause the machine to perform operations including:
- identifying a vertical obstruction from the two-dimensional altitude intensity grid;
- interpolating a plurality of obstructed ground points; and
- generating an unobstructed ground image from the plurality of obstructed ground points.

17. The machine-readable medium of claim 15, wherein the instructions cause the machine to perform operations including:
- extracting a plurality of Human Activity Layer (HAL) points from the three-dimensional points within a selected altitude difference of the plurality of ground points; and
- generating an HAL image from the plurality of HAL points.

\* \* \* \* \*